United States Patent
Wang et al.

(10) Patent No.: US 12,553,331 B2
(45) Date of Patent: Feb. 17, 2026

(54) SYSTEMS AND METHODS FOR AN ARRAY OF DIFFERENT DOWNHOLE SENSORS IN A SINGLE TOOL BODY

(71) Applicant: WELL RESOLUTIONS TECHNOLOGY, Houston, TX (US)

(72) Inventors: Tsili Wang, Houston, TX (US); Borislav J. Tchakarov, Houston, TX (US)

(73) Assignee: WELL RESOLUTIONS TECHNOLOGY, Houston, TX (US)

( * ) Notice: Subject to any disclaimer, the term of this patent is extended or adjusted under 35 U.S.C. 154(b) by 0 days.

(21) Appl. No.: 18/090,209

(22) Filed: Dec. 28, 2022

(65) Prior Publication Data

US 2023/0135986 A1    May 4, 2023

Related U.S. Application Data

(60) Continuation-in-part of application No. 17/322,165, filed on May 17, 2021, now Pat. No. 12,241,358, (Continued)

(51) Int. Cl.
   *E21B 47/024*    (2006.01)
   *E21B 7/06*    (2006.01)
   (Continued)

(52) U.S. Cl.
   CPC ............ *E21B 44/005* (2013.01); *E21B 7/062* (2013.01); *E21B 47/024* (2013.01); *E21B 47/09* (2013.01);
   (Continued)

(58) Field of Classification Search
   CPC ... G01V 3/12; G01V 3/26; G01V 3/28; G01V 3/30; G01V 3/34; E21B 44/005;
   (Continued)

(56) References Cited

U.S. PATENT DOCUMENTS

| 4,636,731 A | 1/1987 | Savage |
| 5,491,488 A | 2/1996 | Wu |

(Continued)

OTHER PUBLICATIONS

Int'l Search Report and Written Opinion (PCT/US2014/042192), dated Dec. 22, 2014 (cited in Parent U.S. Appl. No. 14/303,232, filed Jun. 12, 2014.

(Continued)

*Primary Examiner* — Lee E Rodak
*Assistant Examiner* — Demetrius R Pretlow
(74) *Attorney, Agent, or Firm* — HUNTON ANDREWS KURTH LLP

(57) ABSTRACT

The present application pertains in one embodiment to a sensor sub for use in a drillstring having a drill bit on a distal end for drilling a wellbore in a formation. The sensor sub comprises a tool body having a longitudinal axis; a first pocket on the tool body wherein said first pocket extends radially inward from an outer surface of the tool body and a second pocket on the tool body wherein said second pocket extends radially inward from an outer surface of the tool body. The first pocket comprises a first sensor selected from a type consisting of resistivity sensor, a sonic sensor, an ultrasonic sensor; a pressure sensor; an electrical imaging sensor; a gamma sensor; a density sensor; a neutron sensor; an acoustic sensor, an accelerometer, a magnetometer, and a gyroscope. The second pocket comprises a second sensor selected from a type consisting of resistivity sensor, a sonic sensor, an ultrasonic sensor; a pressure sensor; an electrical imaging sensor; a gamma sensor; a density sensor; a neutron sensor; an acoustic sensor, an accelerometer, a magnetometer, and a gyroscope. The first sensor and the second sensor are each a different type. A control unit may be operably connected to the first sensor and the second sensor such that the control unit is configured to determine the type of sensor, (Continued)

send data to the first and second sensor, and receive data from the first and second sensor.

23 Claims, 16 Drawing Sheets

Related U.S. Application Data which is a continuation of application No. 16/379,261, filed on Apr. 9, 2019, now Pat. No. 11,008,850, which is a continuation of application No. 15/920,034, filed on Mar. 13, 2018, now Pat. No. 10,253,614, which is a continuation of application No. 15/696,543, filed on Sep. 6, 2017, now Pat. No. 9,952,347, which is a continuation of application No. 15/466,507, filed on Mar. 22, 2017, now Pat. No. 9,767,153, which is a division of application No. 14/993,165, filed on Jan. 12, 2016, now Pat. No. 9,645,276, which is a division of application No. 14/303,232, filed on Jun. 12, 2014, now Pat. No. 9,268,053.

(60) Provisional application No. 61/834,272, filed on Jun. 12, 2013.

(51) Int. Cl.
*E21B 44/00* (2006.01)
*E21B 47/09* (2012.01)
*E21B 49/00* (2006.01)
*G01V 3/12* (2006.01)
*G01V 3/26* (2006.01)
*G01V 3/28* (2006.01)
*G01V 3/30* (2006.01)
*G01V 3/34* (2006.01)
*G06F 16/2455* (2019.01)
*G06F 16/2457* (2019.01)
*E21B 17/10* (2006.01)

(52) U.S. Cl.
CPC ............ *E21B 49/00* (2013.01); *G01V 3/12* (2013.01); *G01V 3/26* (2013.01); *G01V 3/28* (2013.01); *G01V 3/30* (2013.01); *G01V 3/34* (2013.01); *G06F 16/24554* (2019.01); *G06F 16/24578* (2019.01); *E21B 17/1078* (2013.01)

(58) Field of Classification Search
CPC ........ E21B 7/062; E21B 47/024; E21B 47/09; E21B 49/00; E21B 17/1078; G06F 16/24554; G06F 16/24578
See application file for complete search history.

(56) References Cited

U.S. PATENT DOCUMENTS

| | | | |
|---|---|---|---|
| 5,757,191 A | 5/1998 | Gianzero | |
| 6,068,394 A * | 5/2000 | Dublin, Jr. | G01L 5/162 |
| | | | 73/152.01 |
| 6,070,662 A * | 6/2000 | Ciglenec | E21B 47/13 |
| | | | 166/177.6 |
| 6,084,052 A * | 7/2000 | Aufdermarsh | E21B 47/017 |
| | | | 250/580 |
| 6,100,696 A | 8/2000 | Sinclair | |
| 6,163,155 A | 12/2000 | Bittar | |
| 6,234,257 B1 * | 5/2001 | Ciglenec | E21B 23/00 |
| | | | 166/250.01 |
| 6,297,639 B1 | 10/2001 | Clark et al. | |
| 6,324,904 B1 * | 12/2001 | Ishikawa | E21B 47/017 |
| | | | 257/E29.022 |
| 6,351,127 B1 | 2/2002 | Rosthal et al. | |
| 6,380,744 B2 | 4/2002 | Clark et al. | |
| 6,476,609 B1 | 11/2002 | Bittar | |
| 6,483,310 B1 | 11/2002 | Meador | |
| 6,509,738 B1 | 1/2003 | Minerbo et al. | |
| 6,577,129 B1 | 6/2003 | Thompson et al. | |
| 6,646,441 B2 | 11/2003 | Thompson et al. | |
| 6,690,170 B2 | 2/2004 | Homan et al. | |
| 6,703,837 B1 | 3/2004 | Wisler et al. | |
| 6,850,168 B2 * | 2/2005 | Tang | G01V 1/44 |
| | | | 367/75 |
| 6,911,824 B2 | 6/2005 | Bittar | |
| 6,969,994 B2 | 11/2005 | Minerbo et al. | |
| 7,019,528 B2 | 3/2006 | Bittar | |
| 7,057,392 B2 | 6/2006 | Wang et al. | |
| 7,138,803 B2 | 11/2006 | Bittar | |
| 7,265,552 B2 | 9/2007 | Bittar | |
| 7,327,145 B2 | 2/2008 | Hauglang | |
| 7,345,487 B2 | 3/2008 | Bittar et al. | |
| 7,375,530 B2 | 5/2008 | Chemali et al. | |
| 7,382,135 B2 | 6/2008 | Li et al. | |
| 7,394,257 B2 * | 7/2008 | Martinez | E21B 47/01 |
| | | | 324/369 |
| 7,414,407 B2 | 8/2008 | Wang et al. | |
| 7,471,088 B2 | 12/2008 | Yu et al. | |
| 7,483,793 B2 | 1/2009 | Wang et al. | |
| 7,536,261 B2 | 5/2009 | Omeragic et al. | |
| 7,557,579 B2 | 7/2009 | Bittar | |
| 7,557,580 B2 | 7/2009 | Bittar | |
| 7,619,540 B2 | 11/2009 | Bonner | |
| 7,659,722 B2 | 2/2010 | Bittar | |
| 7,669,668 B2 | 3/2010 | Martinez | |
| 7,723,991 B2 | 5/2010 | Signorelli et al. | |
| 7,848,887 B2 | 12/2010 | Yang et al. | |
| 7,888,940 B2 | 2/2011 | Hall | |
| 7,894,990 B2 | 2/2011 | Wang et al. | |
| 7,912,648 B2 | 3/2011 | Tang et al. | |
| 7,948,238 B2 | 5/2011 | Bittar | |
| 7,990,153 B2 | 8/2011 | Streinz et al. | |
| 7,991,555 B2 | 8/2011 | Yang et al. | |
| 8,085,049 B2 | 12/2011 | Bittar | |
| 8,085,050 B2 | 12/2011 | Bittar et al. | |
| 8,089,268 B2 | 1/2012 | Wang | |
| 8,159,227 B2 | 4/2012 | Wang | |
| 8,378,908 B2 * | 2/2013 | Wisler | H01Q 21/205 |
| | | | 343/788 |
| 8,749,243 B2 | 6/2014 | Bittar | |
| 8,890,531 B2 | 11/2014 | Beste | |
| 9,268,053 B2 | 2/2016 | Wang | |
| 10,365,391 B2 | 7/2019 | Wang | |
| 2002/0105333 A1 | 8/2002 | Amini | |
| 2002/0113717 A1 * | 8/2002 | Tang | G01V 1/44 |
| | | | 340/856.4 |
| 2002/0167418 A1 | 11/2002 | Goswami | |
| 2003/0184488 A1 | 10/2003 | Smith | |
| 2004/0123655 A1 | 7/2004 | MacPherson | |
| 2004/0238166 A1 * | 12/2004 | Salamitou | E21B 49/00 |
| | | | 166/255.1 |
| 2004/0257912 A1 * | 12/2004 | Dubinsky | G01V 1/52 |
| | | | 367/81 |
| 2005/0006090 A1 | 1/2005 | Chemali | |
| 2005/0078555 A1 * | 4/2005 | Tang | G01V 1/44 |
| | | | 367/31 |
| 2005/0087367 A1 * | 4/2005 | Hutchinson | E21B 49/003 |
| | | | 175/45 |
| 2005/0099184 A1 | 5/2005 | Gianzero | |
| 2005/0189945 A1 | 9/2005 | Reiderman | |
| 2005/0212520 A1 * | 9/2005 | Homan | G01V 3/30 |
| | | | 324/343 |
| 2006/0157277 A1 | 7/2006 | Bittar | |
| 2006/0290529 A1 | 12/2006 | Flanagan | |
| 2008/0035376 A1 * | 2/2008 | Freyer | E21B 12/00 |
| | | | 702/9 |
| 2008/0053707 A1 * | 3/2008 | Martinez | G01V 11/005 |
| | | | 175/73 |
| 2008/0074336 A1 | 3/2008 | Signorelli | |
| 2008/0158082 A1 | 7/2008 | Wang | |
| 2008/0224707 A1 | 9/2008 | Wisler et al. | |
| 2009/0030615 A1 * | 1/2009 | Clark | E21B 47/0228 |
| | | | 175/45 |

(56) References Cited

U.S. PATENT DOCUMENTS

| | | |
|---|---|---|
| 2009/0278543 A1 | 11/2009 | Beste |
| 2009/0295393 A1 | 12/2009 | Bespalow et al. |
| 2009/0301781 A1 | 12/2009 | Fang |
| 2010/0097067 A1 | 4/2010 | Synder, Jr. et al. |
| 2010/0117855 A1* | 5/2010 | Sinclair .................. G01V 3/28 |
| | | 340/854.6 |
| 2010/0123462 A1 | 5/2010 | Bittar |
| 2010/0244841 A1 | 9/2010 | Wang |
| 2010/0244842 A1 | 9/2010 | Wang |
| 2010/0277176 A1 | 11/2010 | Homan et al. |
| 2010/0286916 A1 | 11/2010 | Wang |
| 2010/0295547 A1 | 11/2010 | Hall |
| 2011/0057656 A1* | 3/2011 | Tchakarov ............. E21B 10/00 |
| | | 324/369 |
| 2011/0068797 A1 | 3/2011 | Hall et al. |
| 2011/0074427 A1 | 3/2011 | Wang et al. |
| 2011/0074428 A1 | 3/2011 | Wang |
| 2011/0084697 A1 | 4/2011 | Wisler et al. |
| 2011/0084698 A1 | 4/2011 | Wisler |
| 2011/0084699 A1 | 4/2011 | Wisler et al. |
| 2011/0161009 A1 | 6/2011 | Wang |
| 2011/0187373 A1 | 8/2011 | Wisler et al. |
| 2011/0192597 A1* | 8/2011 | Roddy .................... E21B 43/25 |
| | | 166/253.1 |
| 2011/0238312 A1 | 9/2011 | Seydoux et al. |
| 2011/0265584 A1* | 11/2011 | Segura ................. G01V 11/005 |
| | | 73/866.5 |
| 2011/0308794 A1 | 12/2011 | Bittar |
| 2012/0037423 A1* | 2/2012 | Geerits .................... G01V 1/48 |
| | | 175/50 |
| 2012/0209528 A1 | 8/2012 | Itskovich |
| 2013/0038332 A1 | 2/2013 | Graf |
| 2013/0046474 A1 | 2/2013 | Bittar et al. |
| 2013/0168081 A1 | 7/2013 | Yang |
| 2013/0226459 A1 | 8/2013 | Gorek |
| 2013/0234717 A1 | 9/2013 | Wang |
| 2013/0241561 A1 | 9/2013 | Allen |
| 2013/0261975 A1 | 10/2013 | Yang |
| 2013/0320985 A1 | 12/2013 | Liu et al. |
| 2013/0341095 A1* | 12/2013 | Perrin ..................... E21B 7/062 |
| | | 175/45 |
| 2014/0240141 A1* | 8/2014 | Logan ..................... E21B 47/18 |
| | | 340/854.6 |
| 2014/0285205 A1 | 9/2014 | Okonkwo |
| 2014/0312906 A1 | 10/2014 | Gold |
| 2014/0368197 A1 | 12/2014 | Wang |
| 2014/0368380 A1 | 12/2014 | Wang |
| 2015/0240582 A1* | 8/2015 | Bansal .................... E21B 21/06 |
| | | 175/218 |
| 2015/0345283 A1* | 12/2015 | Switzer ................. E21B 47/024 |
| | | 73/152.54 |
| 2016/0230546 A1* | 8/2016 | Braisher ................. E21B 47/13 |
| 2017/0075005 A1* | 3/2017 | Ranjan ................. G01V 11/002 |
| 2017/0211371 A1* | 7/2017 | Brady ........................ G01L 1/16 |
| 2017/0218745 A1* | 8/2017 | Erdos ..................... E21B 44/00 |
| 2018/0003851 A1* | 1/2018 | Zhang .................... G01V 3/26 |
| 2018/0051700 A1* | 2/2018 | Sheth ...................... F04D 29/22 |
| 2018/0052131 A1* | 2/2018 | Leuenberger ............ G01V 1/52 |
| 2018/0074219 A1 | 3/2018 | Wang |
| 2019/0196047 A1* | 6/2019 | Chaney .................... G01V 3/30 |
| 2019/0338628 A1* | 11/2019 | Sehsah .................... E21B 47/09 |
| 2019/0353023 A1* | 11/2019 | Whitacre .................. E21B 7/06 |
| 2021/0156247 A1* | 5/2021 | Bland .................... E21B 49/006 |
| 2022/0034223 A1* | 2/2022 | Evans ..................... E21B 47/26 |
| 2022/0170352 A1* | 6/2022 | Tajallipour .............. E21B 47/18 |

OTHER PUBLICATIONS

Extended European Search Report dated Jan. 9, 2017 issued in EP 14811280 [cited in parent U.S. Appl. No. 14/993,165, filed Jan. 12, 2016).

Non-Final Office Action dated Sep. 6, 2023 issued in U.S. Appl. No. 17/322,165, filed May 17, 2021.

Final Office action Dated May 20, 2024 issued in U.S. Appl. No. 17/322,165.

Notification Concerning Transmittal of International Preliminary Report on Patentability from related PCT Application No. PCT/US2023/086198, mailed Jul. 10, 2025, 11 pages.

* cited by examiner

SYSTEMS AND METHODS FOR AN ARRAY OF DIFFERENT DOWNHOLE SENSORS IN A SINGLE TOOL BODY

CROSS-REFERENCE TO RELATED APPLICATIONS

This application is a continuation-in-part of Ser. No. 17/322,165 filed May 17, 2021 which is a continuation of U.S. application Ser. No. 16/379,261, filed Apr. 9, 2019, which is a continuation of Ser. No. 15/920,034, filed Mar. 13, 2018 and issuing as U.S. Pat. No. 10,253,614 which is a continuation of U.S. application Ser. No. 15/696,543, filed Sep. 6, 2017 and now issued as U.S. Pat. No. 9,952,347, which is a continuation of U.S. application Ser. No. 15/466,507, filed Mar. 22, 2017 and now issued as U.S. Pat. No. 9,767,153, which claims priority to U.S. application Ser. No. 14/993,165, filed Jan. 12, 2016 and now issued as U.S. Pat. No. 9,645,276, which claims priority to U.S. application Ser. No. 14/303,232, filed Jun. 12, 2014, and now issued as U.S. Pat. No. 9,268,053, which claims priority to U.S. Provisional Application No. 61/834,272 filed Jun. 12, 2013, all of which are incorporated herein by reference in their entireties. This application claims priority under 35 U.S.C. § 119(e) to U.S. Provisional Application No. 61/834,272 filed Jun. 12, 2013, which is incorporated herein by reference in its entirety.

FIELD

Embodiments disclosed herein relate to, for example, systems and methods using an array of different downhole sensors in a single tool body.

BACKGROUND AND SUMMARY

Well logging, also known as borehole logging, is the practice of making a detailed record (a well log) of the geologic formations penetrated by a borehole. Resistivity logging is a method of well logging that works by characterizing the rock or sediment in a borehole by measuring its electrical resistivity. Resistivity is a fundamental material property which represents how strongly a material opposes the flow of electric current. Most rock materials are essentially insulators, while their enclosed fluids are conductors. Hydrocarbon fluids are an exception, because they are almost infinitely resistive. When a formation is porous and contains salty water, the overall resistivity will be low. When the formation contains hydrocarbons, or contains very low porosity, its resistivity will be high. High resistivity values may indicate a hydrocarbon bearing formation.

In oil and gas field well logging, multiple sensors are often employed to measure underground rocks to obtain different physical and/or chemical properties of the rocks. Those properties are then used to analyze the amount of hydrocarbons in the rocks and the ability to produce them. For example, as described above resistivity sensors may be used to measure electrical properties (resistivities) of reservoir rocks which are used to evaluate the amount of hydrocarbons in rocks. Gamma sensors may be used to distinguish between different types of rocks with, e.g., high gamma readings usually indicating shales and low gamma readings indicating sands and/or carbonates.

Traditionally, different types of sensors are built in separate tool bodies to meet specific application needs. For example, in a conventional triple combo logging-while-drilling application, a resistivity sensor, a density sensor, and a neutron sensor are each built in a separate tool body such that three tool bodies are employed. The three tool bodies are electrically linked together through a common communications bus to form a tool string so the three tool bodies may be used together during drilling. Other sensors such as an acoustic sensor may also be combined in the same tool string, making the tool string longer.

A drawback of such a three or more tool combination is that the multiple tool bodies must be built and run which significantly increases manufacturing and operational costs. Another drawback is that stacking multiple tool bodies to form a long tool string can substantially increase drilling complexity. Moreover, combining multiple sensor bodies in a string may often mean some of the sensors are far behind the drill bit and this may make the measurements less sensitive and therefore less reliable to the formation rocks being drilled. This problem becomes especially profound for an at-bit tool string, i.e., a tool string near the drill bit. When an at-bit tool is used below, e.g., a motor, the tool length must be strictly controlled to maintain the bit steerability at an acceptable level. The longer the tool string is the more negative impact there is on the bit steerability. Thus, there is a need to improve systems using multiple sensors, especially for an at-bit tool string.

Advantageously, the present systems and methods improve systems using multiple sensors on a tool string such as an at-bit tool string. The present application pertains in one embodiment to a sensor sub for use in a drillstring having a drill bit on a distal end for drilling a wellbore in a formation. The sensor sub comprises a tool body having a longitudinal axis; a first pocket on the tool body wherein said first pocket extends radially inward from an outer surface of the tool body and a second pocket on the tool body wherein said second pocket extends radially inward from an outer surface of the tool body. The first pocket comprises a first sensor selected from a type consisting of resistivity sensor, a sonic sensor, an ultrasonic sensor; a pressure sensor; an electrical imaging sensor; a gamma sensor; a density sensor; a neutron sensor; an acoustic sensor, an accelerometer, a magnetometer, and a gyroscope. The second pocket comprises a second sensor selected from a type consisting of resistivity sensor, a sonic sensor, an ultrasonic sensor; a pressure sensor; an electrical imaging sensor; a gamma sensor; a density sensor; a neutron sensor; an acoustic sensor; an accelerometer, a magnetometer, and a gyroscope. Other sensors that may be used as the first and/or the second sensor include, for example, a short spacing detector, a long spacing detector, a focusing electrode, or measuring electrode. The first sensor and the second sensor are each a different type in some embodiments or the same type in some embodiments. A control unit may be operably connected to the first sensor and the second sensor such that the control unit is configured to determine the type of sensor, send data to the first and second sensor, and receive data from the first and second sensor.

In another aspect, embodiments disclosed herein relate to a resistivity measuring tool used in a drillstring having a drill bit on a distal end for drilling a wellbore in a formation including a tool body having a longitudinal axis, a sensor configured to measure the angular position of the tool body relative to the wellbore, at least one axial antenna including a wire winding for generating an axial magnetic moment parallel with the longitudinal axis, and at least one transverse antenna. The transverse antenna includes an antenna body disposed within a pocket extending radially inward from an outer surface of the tool body and one or more turns of wire wound around the antenna body, the wire winding generating a transverse magnetic moment orthogonal to the longitudinal axis. At least one antenna is configured to transmit electromagnetic energy into the formation and induce a voltage signal related to a parameter of the formation in a different antenna.

In other aspects, embodiments disclosed herein relate to a method of making resistivity measurements of a formation from a wellbore being drilled including providing a resistivity measuring tool including a tool body having a sensor configured to measure the angular position of the tool body relative to the wellbore, at least one axial antenna including a wire winding for generating an axial magnetic moment, and at least one transverse antenna disposed proximate to an outer surface of the tool body and including a wire winding for generating a transverse magnetic moment. The method further includes transmitting electromagnetic energy into the formation from at least one of the antennas, thereby inducing a voltage signal related to a formation parameter in the wire winding of a non-transmitting antenna, measuring an angular position of the tool body relative to the wellbore with the sensor, and correlating the formation parameter with the measured angular position of the tool body.

In yet other aspects, embodiments disclosed herein relate to a method of making resistivity measurements of a formation from a wellbore being drilled including providing a resistivity measuring tool including a tool body having a sensor configured to measure the angular position of the tool body relative to the wellbore, at least two axial antennas each including a wire winding for generating an axial magnetic moment, and a transverse antenna disposed between the two axial antennas and including a wire winding for generating a transverse magnetic moment. The method further includes substantially simultaneously driving a current to the wire windings of the two axial antennas for generating a current loop in the formation, thereby inducing a voltage signal related to a formation parameter in the wire winding of the transverse antenna disposed therebetween, measuring an angular position of the tool body relative to the wellbore with the sensor, and correlating the formation parameter with the measured angular position of the tool body.

In still other aspects, embodiments disclosed herein relate to a method of data binning including partitioning a circumference of a tool face into M number of sectors, defining each data point relating to resistivity information by a fidelity function $g(\Phi)$, assigning to each data point a weight for each of the M number of sectors, wherein the weight is associated with an integral of the fidelity function $g(\Phi)$ over the sector, and computing an average of the data points weighted by their respective weights for each of the M sectors.

DETAILED DESCRIPTION

A downhole resistivity measuring tool suitable for use in any downhole environment is disclosed. A drill bit is secured to the lower end of the drill collar measurement tubular for drilling a rock formation. The measurement tubular may also include a resistivity measuring tool, communications package, and other downhole measurement tools to measure, for example, the acoustic velocity, the natural radiation, and the density of the formation surrounding the wellbore. The resistivity measuring tool disclosed may be used both when the measurement tubular is rotating, slowly rotating, or not rotating. The communications package communicates between the electromagnetic resistivity tool and other downhole measurement tools and a surface control system by any means. For example, the communications package may use mud pulse telemetry and electrical telemetry techniques for communicating with a surface control system. The measurement tool includes a sensor configured to measure the angular position of the tool body relative to the wellbore.

Resistivity measuring tools use an electric coil to generate an alternating current loop in the formation by induction. The alternating current loop, in turn, induces a voltage signal in a receiving coil located elsewhere in the tool. The voltage signal induced in the receiving coil is related to a parameter of the formation. Multiple transmitting and receiving coils may be used to focus formation current loops both radially (depth of investigation) and axially (vertical resolution).

As used herein in reference to antennas, "transverse" refers to a magnetic moment, created by electrical current in a wire loop, having a direction orthogonal or substantially orthogonal relative to a longitudinal axis of the tool body. "Axial" refers to a magnetic moment, created by electrical current in a wire loop, having a direction aligned or substantially aligned or parallel with a longitudinal axis of the tool body.

For frame of reference and as used herein, the Z-axis points along a longitudinal axis of the tool body. The X-axis falls in a gravity plane containing the Z-axis. In a tool including transmitter and receiver antennas oriented in the X, Y, or Z directions, nine different combinations of transmitter and receiver antennas are possible: XX, XY, XZ, YX, YY, YZ, ZX, ZY, and ZZ, where the first letter indicates the orientation of the transmitter antenna and the second letter the orientation of the receiver antenna. Those combinations provide means to image the formation around a borehole. In particular, the XZ, ZX, YZ, and ZY components or their combinations provide the most useful azimuthal resistivity measurement for resolving an adjacent boundary or other geological features around a wellbore.

Figure 1A:
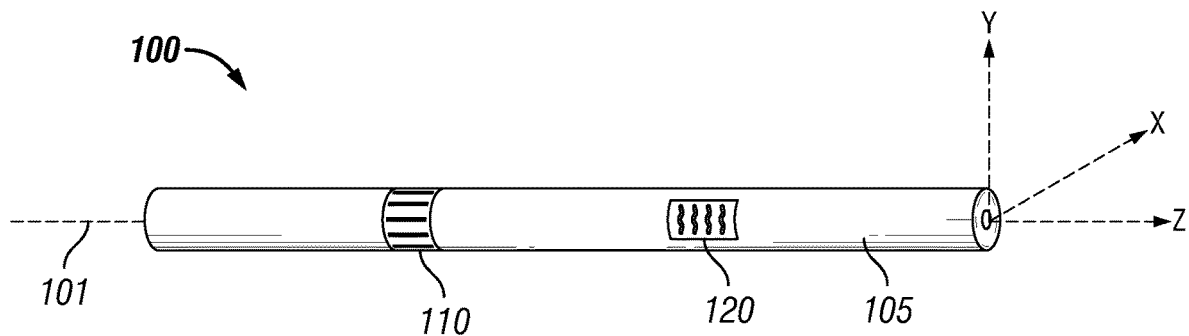
FIGS. 1A-C illustrate embodiments of an azimuthal resistivity measurement tool having a transverse elemental antenna.
Figure 1B:
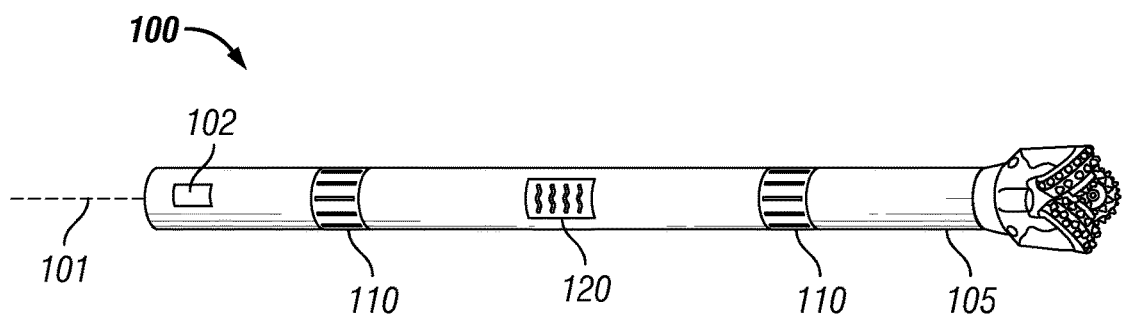
Figure 1C:
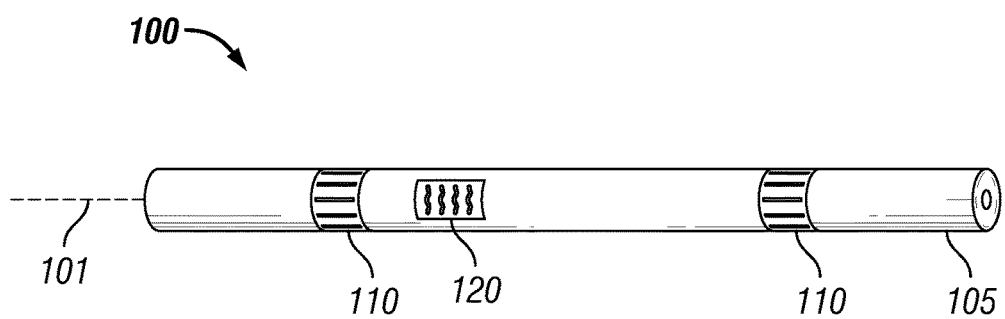

FIGS. 1A-C illustrate embodiments of a resistivity measuring tool 100 including a transverse receiving antenna 120 and an axial transmitting antenna 110. The axial transmitting antenna 110 may be placed in either the uphole direction or the downhole direction relative to the transverse receiving antenna 120. The receiving antenna 120 is spaced apart from the transmitting antenna 110 at a predefined distance. The direction of the magnetic moment of the axial transmitting antenna 110 remains substantially unchanged as the measurement tool 100 rotates, whereas that of the transverse receiving antenna 120 rotates with the tool 100. To make an azimuthal measurement, a current (e.g., alternating) is driven to the axial transmitting antenna 110 (also known as firing the antenna) at moments controlled by a microcontroller (not shown) of the tool to transmit electromagnetic waves into the surrounding medium at a selected frequency. The transmitted signal, when encountering a resistivity boundary near the borehole, is reflected back and received by the transverse receiving antenna 120. The detected voltage signal is recorded at one or more tool face angles as the tool rotates. The measurement tool includes a sensor 102 configured to measure the angular position of the tool body relative to the wellbore (e.g., tool face angles). For example, the sensor 102 may be an accelerometer, a magnetometer, a gyro, or any other known sensor or sensor combination. If multiple transverse receiving antennas are used, the reflected electromagnetic wave may be detected simultaneously by the receiving antennas.

FIGS. 1B and 1C illustrate embodiments of a resistivity measuring tool 100 including a transverse receiving antenna 120 and a pair of symmetrical (FIG. 1B) or asymmetrical (FIG. 1C) axial transmitting antennas 110. The pair of axial transmitting antennas 110 may be energized sequentially or simultaneously as explained later. And as further discussed below, by combining and processing the signals due to the two axial transmitting antennas, whether fired sequentially or simultaneously, a formation resistivity anisotropy effect on the azimuthal measurement may be reduced or removed, leaving the processed response largely sensitive to an adjacent bed boundary. Alternatively, the signals generated by the two axial transmitting antennas 110 may be processed to remove or reduce the bed boundary effect and enhance the formation resistivity anisotropy effect.

Figure 2A:
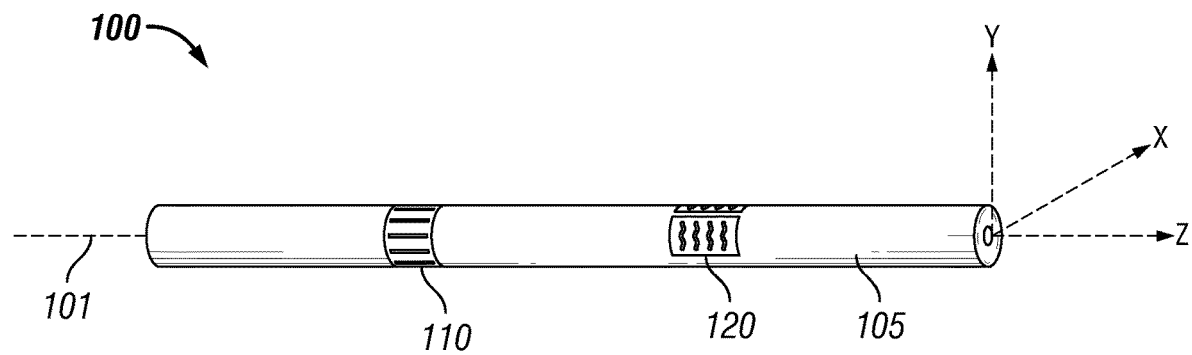
FIGS. 2A-B illustrate embodiments of an azimuthal resistivity measurement tool having multiple azimuthally-spaced transverse elemental antennas.
Figure 2B:
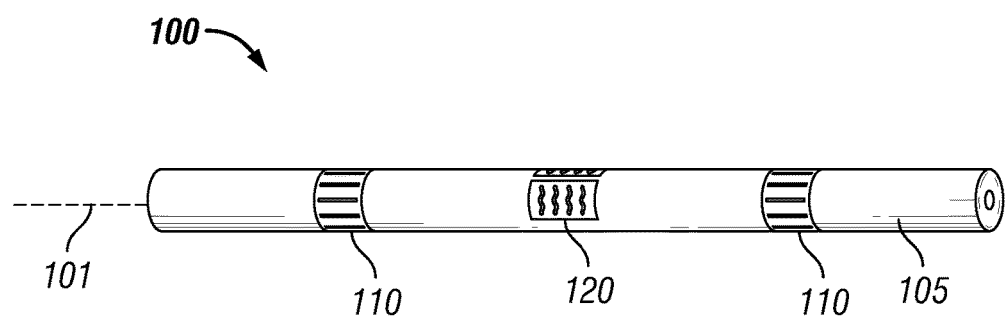

FIGS. 2A and 2B illustrate an embodiment of a resistivity measuring tool 100. Multiple transverse receiving antennas 120 are located around a circumference of the tool body 105 and separated by varying angles in the azimuthal direction, preferably 90 degrees in the azimuthal direction, although a different separation angle may also be used. For example, in certain embodiments, two transverse antennas may be separated by at least about 30 degrees, at least about 45 degrees, or at least about 60 degrees. Transverse receiving antennas are preferably located at substantially the same longitudinal position (e.g., along the Z-axis) on the tool axis but may be located at different longitudinal positions as well. One or more axial transmitting antennas 110 are preferably placed longitudinally on opposite sides of the receiving antenna(s) 120, although they may also be placed on the same side of the receiving antenna(s) 120. When more than one axial transmitting antennas 110 are used, they may be fired sequentially or simultaneously. The measured signals due to the two transmitting antennas 110 may be processed to either remove or enhance the formation resistivity anisotropy effect, discussed in greater detail below. The resistivity measuring tool having multiple transverse receiving antennas azimuthally-spaced around the tool body may be more preferably used to measure formation resistivity when the tool is slowly rotating or not rotating.

Figure 3:
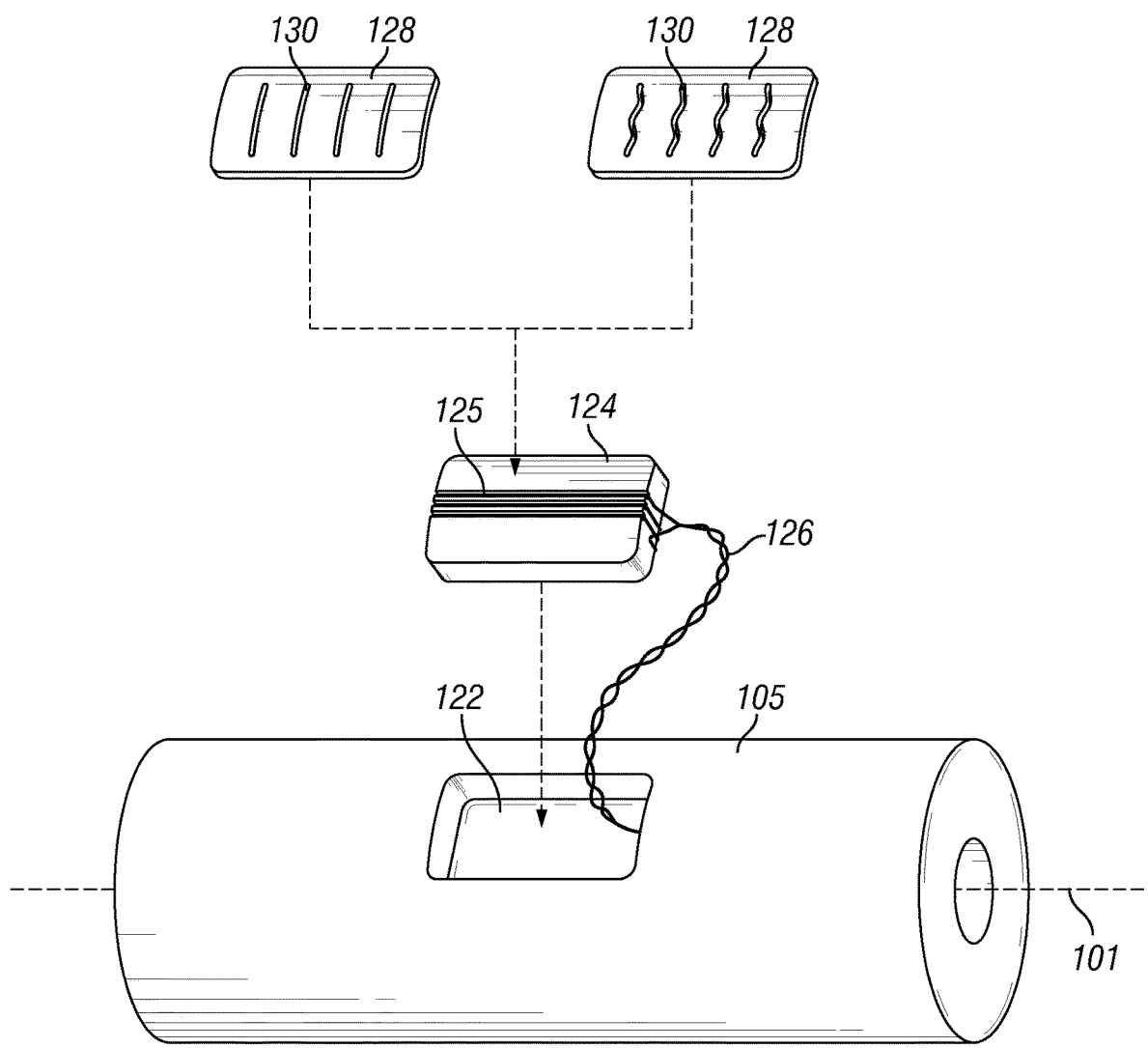
FIG. 3 illustrates an embodiment of transverse elemental antenna components.

FIG. 3 illustrates an embodiment of transverse antenna components. An antenna pocket 122 is formed (e.g., machined, molded, etc.) near an outer surface of a drill collar body 105. The pocket 122 extends radially inward from the outer surface of the drill collar body to a maximum radial depth of one half a diameter of the tool body. Preferably, the pocket may be at least 0.25 inches deep, or up to 0.5 inches deep, or up to about one inch deep, or deeper. The pocket 122 may be any shape including square, rectangle, circle, ellipse or other shapes. In the case of a square or rectangle pocket, the corners of the pocket may be smoothed to reduce stress accumulation around the corners. An antenna body 124 is configured to substantially correspond in shape with and to fit within the pocket 122. The antenna body 124 may be made of any non-conducting material, including but not limited to as PEEK, fiberglass, or ceramic. An antenna wire 126 is wound around the antenna body 124 such that the wire 126 extends substantially along the longitudinal direction (Z-axis) of the tool axis 101. One or multiple turns of wire may be wound around the antenna body 124. To help hold the wire in place, wire grooves 125 may be formed on the outer surface of the antenna body 124. The wire 126 may be insulated with Teflon or other non-conducting material to prevent short-circuiting between turns and from being exposed to drilling fluids. The antenna body 126 with the wound antenna wire 125 is inserted into the antenna pocket 122 such that the moment of the antenna points in a transversal direction. The ends of the antenna wire 125 exit the antenna pocket 122 to a nearby pocket (not shown) formed in the collar body 105 where a preamplifier may be placed to amplify the received signal before the signal is fed to an electronic board (not shown).

An antenna shield 128 may be placed over the antenna body 124 after it is inserted within the antenna pocket 122. Preferably, the antenna shield is configured to sit flush with an outer surface of the collar body 105. The antenna shield 128 may be made of the same material as the collar body 105, or a different, preferably harder, material. In one embodiment, the antenna shield and collar body may be made of stellite. One or more openings 130 may be formed in the antenna shield 128 to allow electromagnetic energy to pass through. The openings 130 are preferably aligned in the azimuthal direction. The antenna shield 128 may be attached to the collar body 105 either with bolts or by welding or other means.

Non-conducting, abrasion-resistant materials, or potting material, may be used to fill any remaining voids or cavities within the antenna pocket 122, after the antenna body 124 is inserted and the antenna shield 128 is attached, for further protection of the antenna wire 126. To increase the antenna efficiency, the potting material may be mixed with magnetic materials so that the mixture has a relative magnetic permeability greater than 1. Such a transversal antenna may be referred to as an "elemental" transverse antenna. Because the shield openings extend substantially along the circumferential direction, they may be subject to wear and tear during drilling. To help protect the potting material from being damaged or worn out, the shield openings may be narrow. To further protect the potting material, curved openings may be used instead of straight openings. Each curved opening is preferably symmetric with respect to the center point of the opening.

Figure 4A:
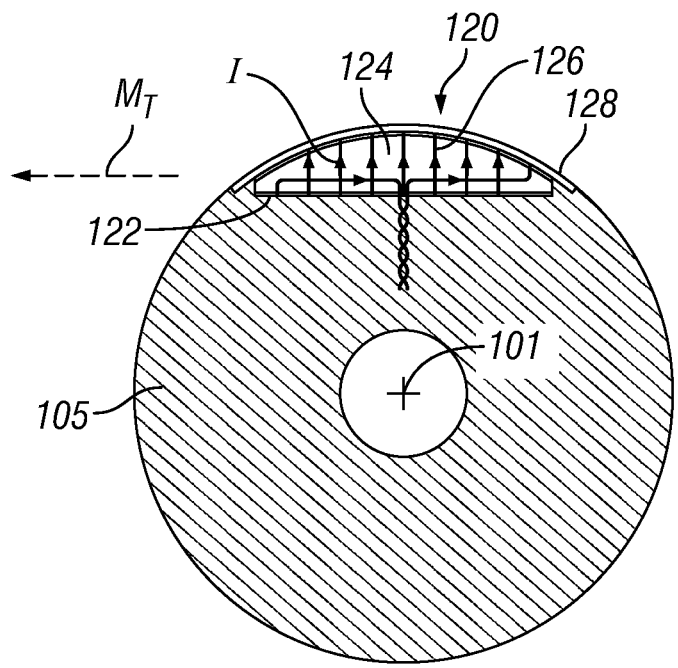
FIGS. 4A-D illustrate embodiments of composite transverse antenna configurations.
Figure 4B:
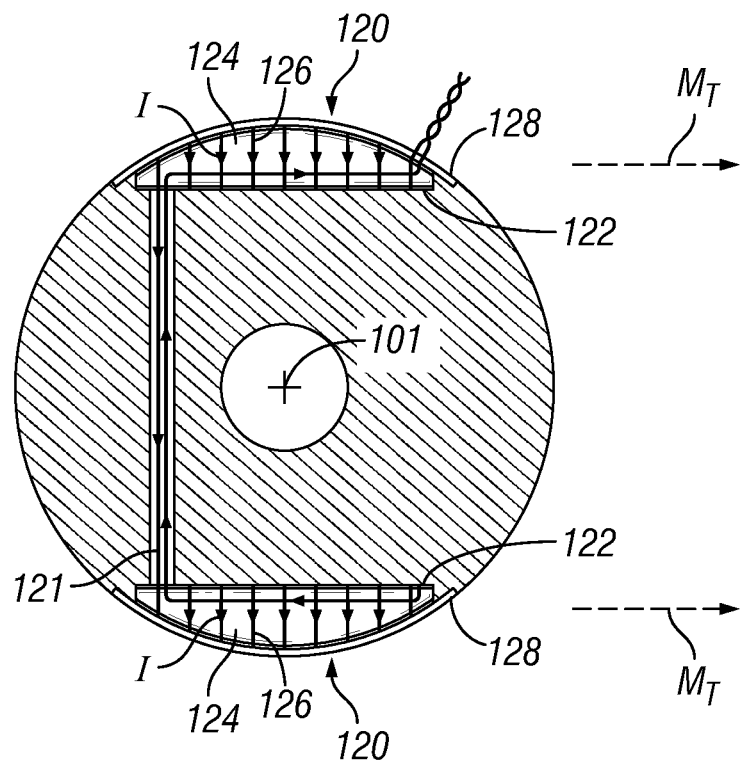

FIGS. 4A-D illustrate cross-section views of a collar body 105 having a pair of transverse elemental antennas 120 combined to form a composite transverse antenna. Any number of composite transverse antenna configurations may be formed. FIG. 4A illustrates an antenna body 124 and antenna wire winding 126 within a pocket 122 and covered by an antenna shield 128, forming a transverse elemental antenna 120. Current "I" flows in the antenna wire winding 126 in a direction shown by the arrows to generate a transverse magnetic moment $M_T$ substantially orthogonal to the tool body axis. FIG. 4B illustrates a pair of transverse elemental antennas 120 disposed opposite each other on the collar body 105 and connected to form a composite transverse antenna. The transverse elemental antennas 120 may be connected by a wire 121 of any diameter that extends from one transverse antenna to the other. The connecting wire 121 may be disposed within the collar body 105 for damage protection, for example, extending through a drilled hole in the collar body 105 starting from one transverse elemental antenna 120 and ending at the second transverse elemental antenna 120. Alternatively, a groove may be machined on an outer surface of the collar body 105, the wire 121 disposed within the groove running between the two transverse antennas, and the groove welded for mechanical protection. Yet other means of wire connection between two transverse elemental antennas are possible. For instance, the wire from each transverse elemental antenna may exit directly to an adjacent electronics board for signal communication. In this case, the pair of transverse elemental antennas may be connected indirectly through the electronics board. The pair of transverse elemental antennas 120 may be connected or coupled in different ways to generate different combinations of transverse magnetic moments.

FIG. 4B illustrates transverse elemental antennas 120, with currents I flowing in the antenna wire windings 126 in directions shown by the arrows, which generate transverse magnetic moments $M_T$ in the same transverse direction. In this configuration, the transverse antenna moments $M_T$ may be additive to each other and the pair of transverse antennas 120 produce a composite transversal antenna with its effective center on the tool axis. That is, the pair of elemental antennas shown in FIG. 4B are connected in series so that signals from each are added to form a stronger signal (e.g., a composite transverse moment=$2M_T$).

Figure 4C:
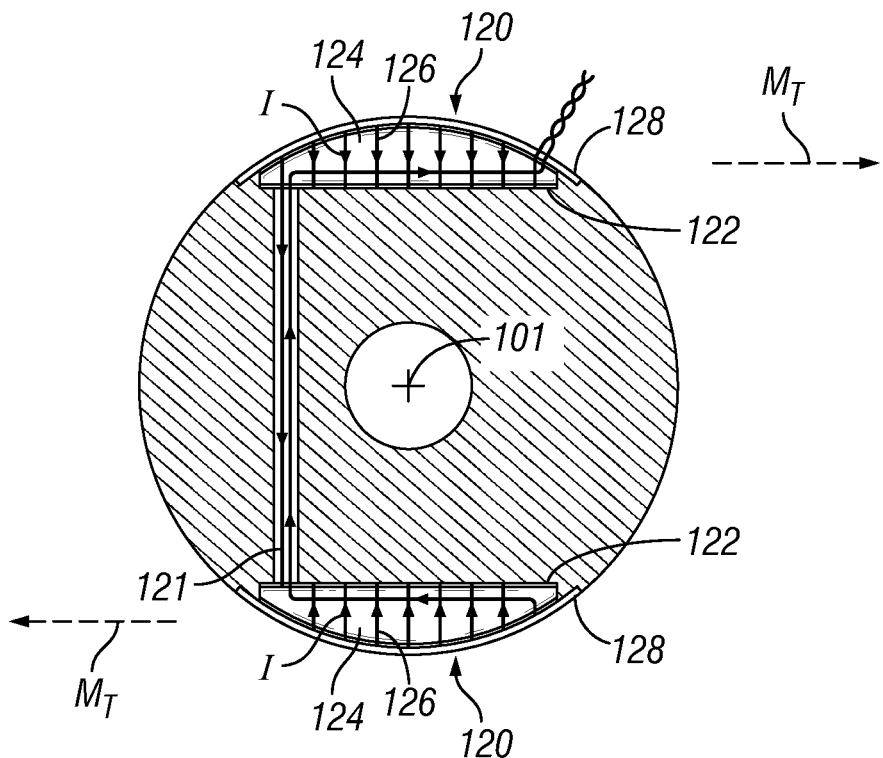

FIG. 4C illustrates transverse elemental antennas 120, with currents I flowing in the antenna wire windings 126 in direction shown by the arrows, which generate transverse magnetic moments $M_T$ in opposite transverse directions. A composite transverse antenna in this configuration will not produce any significant transverse magnetic moment component (e.g., a composite transverse moment≈0). Rather, the resulting magnetic moments may resemble a quadrupole. An electrical current flowing in the tool's longitudinal direction will produce a magnetic field circulating around the collar. The magnetic fields on the opposite sides of the collar will point to opposite azimuthal directions when viewed in a Cartesian coordinate system, which will produce a response in the quadrupole antenna.

Figure 4D:
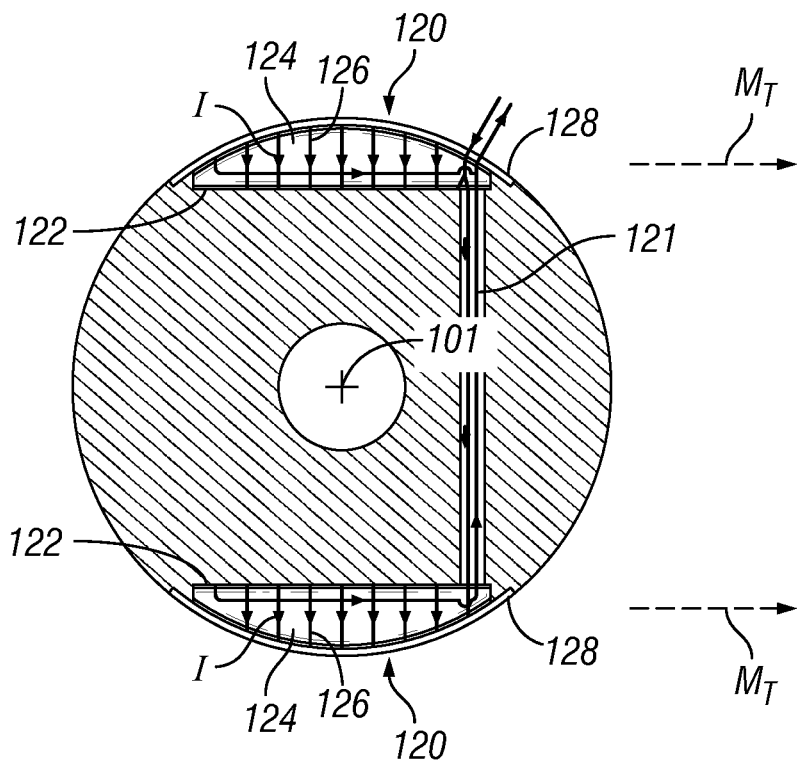

FIG. 4D illustrates transverse elemental antennas 120, with currents I flowing in the antenna wire windings 126 in directions shown by the arrows, which generate transverse magnetic moments $M_T$ in the same transverse direction, similar to FIG. 4B. However, the antennas shown in FIG. 4D are electrically connected in parallel. Therefore, transverse magnetic moments $M_T$ are not added (e.g., a composite transverse moment=$M_T$), however if one antenna fails the other still provides the same signal strength. That is, transverse elemental antennas electrically connected in parallel provide redundancy in case one antenna fails, the composite antenna will still have the same moment as if there was no failure.

Figure 5:
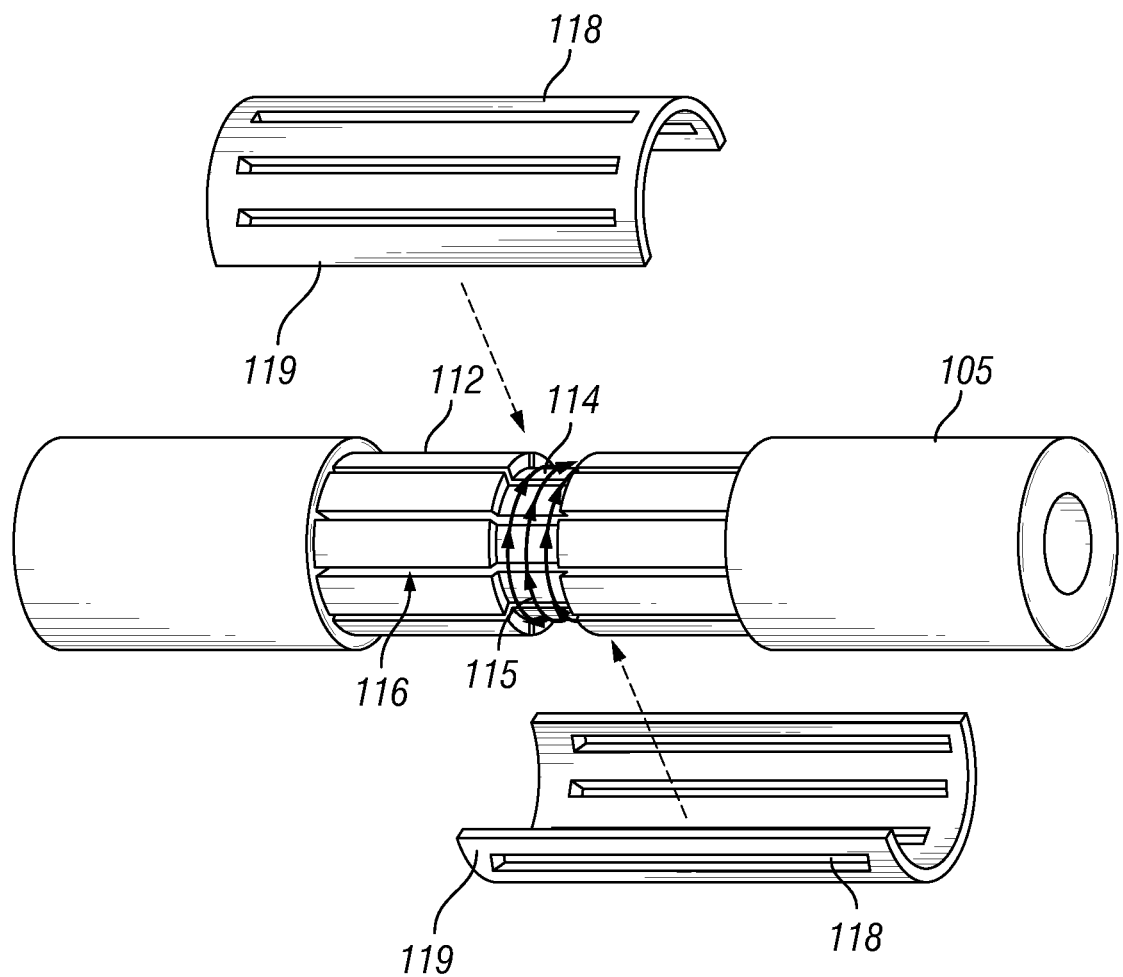
FIG. 5 illustrates an embodiment of axial antenna components.

FIG. 5 illustrates an embodiment of axial antenna components. An antenna groove 112 may be formed in an outer surface of the tool body 105. The width of the antenna groove 112 may be at least one-half inch or up to eight inches or greater, but preferably between one inch and six inches measured along the longitudinal direction of the collar. A depth of the antenna groove 112 may be at least 0.05 inches, at least 0.1 inches, at least 0.25 inches, at least 0.5 inches, at least one inch, or greater. A wire groove 114 may be formed in an outer surface and near the center of the antenna groove 112. The wire groove 114 should be wide and deep enough to hold one or multiple turns of antenna wire 115. Individual wire ways may also be created to hold each turn of wire in place. Longitudinal slots 116 may be formed in an outer surface of the antenna groove 112 for passage of electromagnetic wave energy, and may be referred to as passage slots. The passage slots 116 may be at least 0.25 inches deep, or at least 0.5 inches deep, or at least one inch deep, depending on the size of the collar. The passage slots 116 may be separated from each other by at least approximately 0.25 inches, or at least 0.5 inches, or at least one inch, or at least two inches, or greater. One or multiple turns of antenna wire 115 may be disposed in the wire groove 114. The antenna wire 115 may exit the antenna groove through pressure sealed connectors to a pressure-sealed pocket (not shown) near the antenna groove 112.

An antenna shield 118 may be placed on top of the antenna groove 112 to cover the antenna wire. The antenna shield 118 may be made of the same material as the collar body 105 or a different, preferably harder, material (e.g., stellite) to protect the antenna wire from being damaged during drilling. The antenna shield 118 may include two or more cylindrical pieces, each having multiple slots 119 formed within. The shield slots 119 may be aligned with the passage slots 116 formed in the antenna groove 112. The shield slots 119 may be at least 0.05 inches wide, or at least 0.1 inches wide, or at least 0.5 inches wide, or at least one inch wide, but are preferably within 0.1 to 0.5 inches wide and do not have to be the same width as the underneath passage slots. The thickness of the shield may be at least 0.05 inches, or at least 0.1 inch, or at least 0.25 inches, or at least 0.5 inches, or at least one inch, or greater. The shield 118 may be secured or locked to the collar body 105 either through welding or by bolts. Further, the antenna body may be vacuumed and potted with non-conducting material for integrity and damage protection. The surface of the antenna may be polished to remove any outstanding material.

Figure 6A:
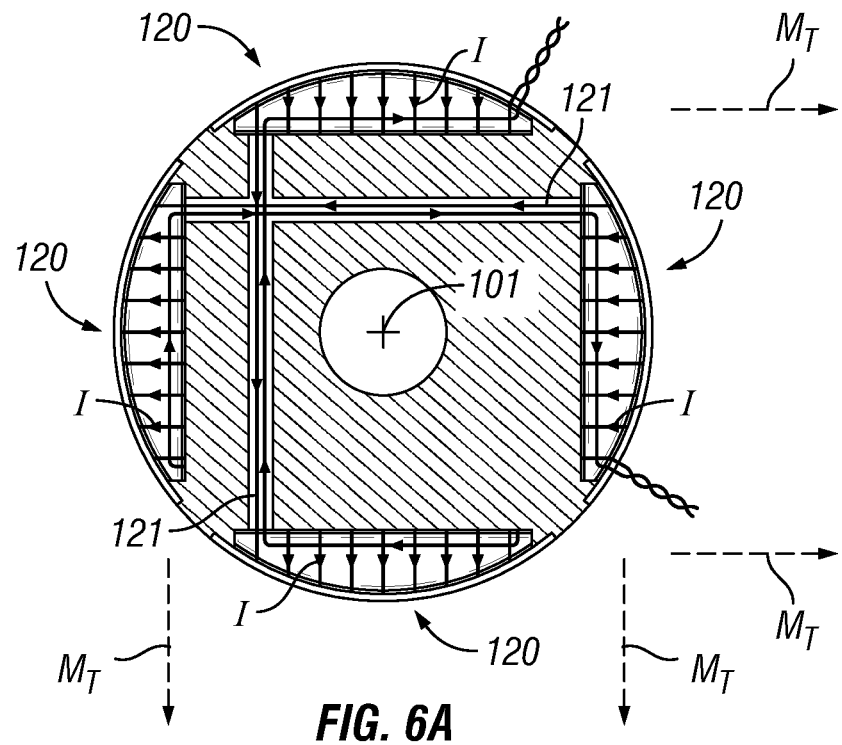
FIGS. 6A-C illustrate embodiments of co-located antennas.
Figure 6B:
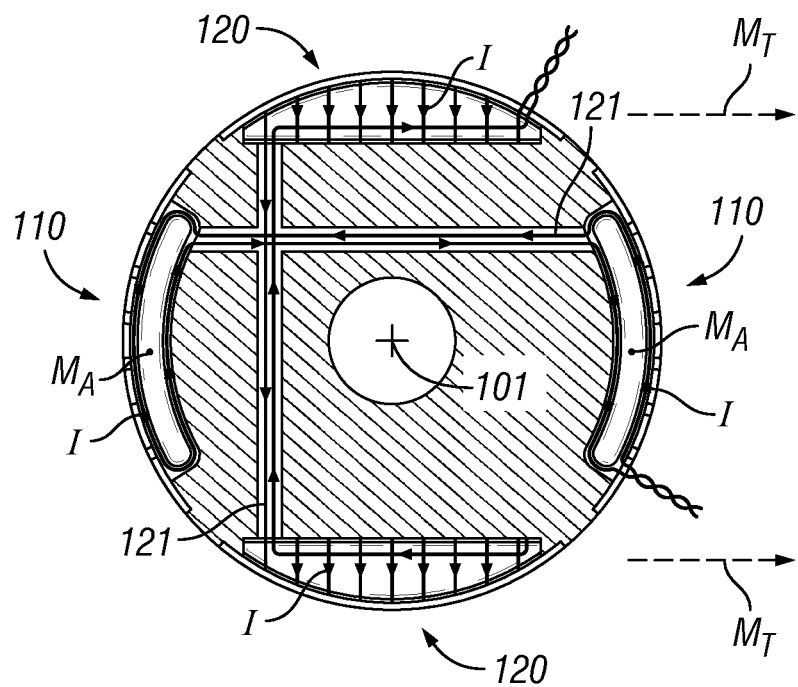
Figure 6C:
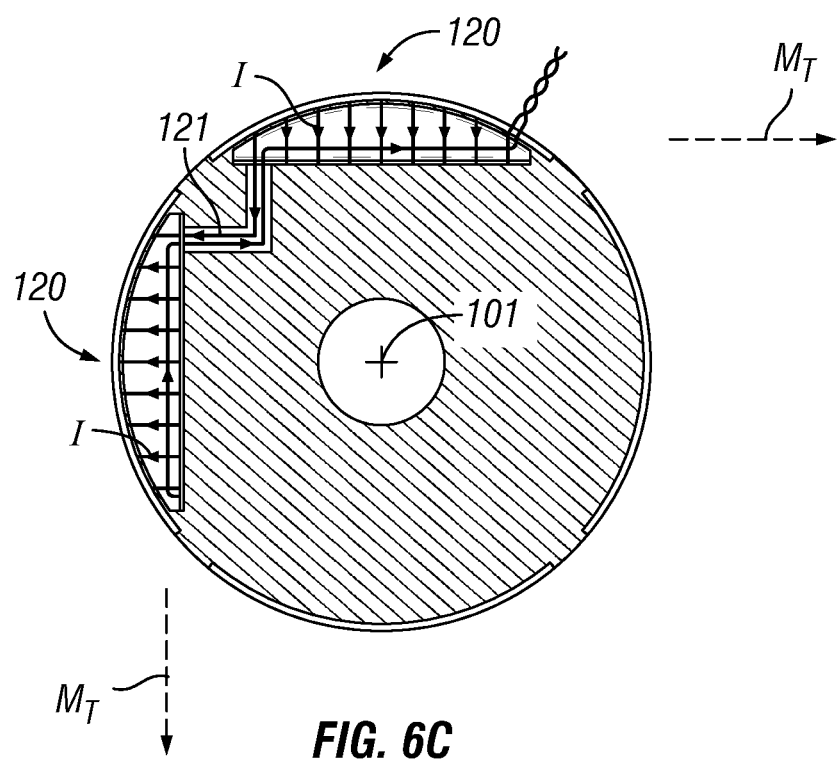

FIGS. 6A-C illustrate embodiments of co-located antennas in the drill collar body. FIG. 6A illustrates an embodiment of co-located transverse antennas, each including a pair of transverse elemental antennas 120 connected as discussed in reference to FIGS. 4A-D. The pairs of transverse antennas generate magnetic moments $M_T$ in the same direction, although any of the composite transverse antenna arrangements may be configured. Connecting wires 121 and wire ways between the pairs of transverse elemental antennas 120 preferably do not intercept, and each transverse elemental antenna 120 transmits or receives electromagnetic energy independently. FIG. 6B illustrates an embodiment of co-located transverse elemental antennas 120 and axial antennas 110. The pair of transverse antennas 120 generate magnetic moments $M_T$ in the same direction, although any of the composite transverse antenna arrangements may be configured. The pair of axial antennas 110 generate magnetic moments MA in either direction. The axial antenna 110 includes two axial elemental antennas spaced apart by 180 degrees in the azimuthal direction and connected by a wire way for wire passage 121. The wire ways preferably do not intercept each other. In certain instances, the axial antenna may include a single axial antenna, in which case no wire way will be needed.

Various methods of making azimuthal resistivity measurements with and without tool rotation are disclosed. One purpose of azimuthal resistivity measurements is generating information for resolution of the azimuthal direction of and distance to an adjacent boundary near the wellbore. This may be accomplished with one axial transmitting antenna and one elemental transversal receiving antenna. While the transmitting antenna is firing, a signal is acquired from the receiving antenna as the tool rotates. In the presence of a bed boundary near the wellbore and assuming that the boundary is azimuthally located at a tool face angle of $\phi_0$, the signal measured will vary with tool face angle as:

$$A(\phi)=A_0 \cos(\phi+\phi_0) \tag{1}$$

where $A_0$ is the maximum (in the absolute value) value of the azimuthal signal when the transversal receiver antenna points toward the boundary, i.e., at the tool face angle $\phi_0$ and $\phi$ is tool face angle. In equation (1), $A_0$ depends on the resistivities of both the near and the remote beds, distance to the boundary, coil spacing, frequency, antenna moments, and the driving current in the transmitting antenna. Solving equation (1) for $A_0$ and $\phi_0$ requires at least two independent measurements, which may be accomplished by taking measurements at two or more distinct tool face angles. It may be expressed as:

$$A_1 = A_0 \cos(\phi_1+\phi_0)+e_1 \tag{2}$$

$$A_2 = A_0 \cos(\theta_2+\phi_0)+e_2 \tag{3}$$

$$\ldots$$

$$A_n = A_0 \cos(\phi_n+\phi_0)+e_n \tag{4}$$

In equations (2)-(4), $e_1, e_2, \ldots e_n$ are measurement errors, and the equations may be solved in the least-square sense which is well known.

In the case where the tool does not rotate, multiple transverse antennas are used to generate independent measurements at different tool face angles. For example, two transverse elemental antennas separated by 90 degrees in the azimuthal direction, may be used. They are preferably located at the same longitudinal position on the tool axis but this is not necessary. Measurements from each antenna may be written as:

$$A_1 = A_0 \cos(\phi_1+\phi_0)+e_1 \tag{5}$$

$$A_2 = A_0 \cos(\phi_1+90+\phi_0)+e_2 = A_0 \sin(\phi_1+\phi_0)+e_2 \tag{6}$$

Equations (5)-(6) may be solved for $A_0$ and $\phi_0$ using a least squares methods. Here, in a cross-section view, the magnetic moments generated by the two transversal antennas are assumed to be orthogonal to each other, although not necessary. In general, the two transverse elemental antennas may be separated in the azimuthal direction by any angle between 0° and 360°. In this case, equations (5)-(6) becomes:

$$A_1 = A_0 \cos(\phi_1+\phi_0)+e_1 \tag{7}$$

$$A_2 = A_0 \cos(\phi_1+\Delta\phi+\phi_0)+e_2 \tag{8}$$

where $\Delta\phi$ is the azimuthal angle separation between the two antennas.

For the special case of equations (5)-(6) and in the absence of measurement noises, both $A_0$ and $\phi_0$ may be computed as:

$$A_0 = (A_1^2 + A_2^2)^{1/2} \tag{9}$$

$$\phi_0 = \tan^{-1}\left(\frac{A_2}{A_1}\right) \tag{10}$$

For the general case of equations (7)-(8), inversion must be applied to compute $A_0$ and $\phi_0$.

If multiple transverse elemental antennas are used that are located at substantially the same longitudinal position on the tool axis, it is possible to form a virtual transversal antenna by combining the multiple transversal antennas. The combination may be done either by electrically connecting the antennas together or by adding their responses together, examples of which were discussed in reference to FIGS. 4A-D. For instance, if two transverse elemental antennas are separated by an azimuthal angle $\Delta\phi$, then their combined response:

$$A = A_1 \cos(\phi+\phi_0)+A_2 \cos(\phi+\Delta\phi+\phi_0) = B \cos(\phi+\phi') \tag{11}$$

is another cosine function of the tool face angle. In the above, $$B = (A_1^2 + A_2^2 + 2A_1 A_2 \cos\Delta\phi)^{1/2} \tag{12}$$

$$\phi' = \tan^{-1}\left(\frac{A_1\sin\phi_0 + A_2\sin(\phi_0 + \Delta\phi)}{A_1\cos\phi_0 + A_2\cos(\phi_0 + \Delta\phi)}\right) \tag{13}$$

Advantageously, combined antennas or signals over individual antennas or signals may lead to better noise rejection and improved signal-to-noise ratios. And, if one of the antennas fails, the combined signal will still be usable.

Signals from multiple transverse elemental receiving antennas may be acquired simultaneously when a transmitting antenna fires. The signals may also be acquired sequentially as a transmitting antenna fires, regardless of tool rotation. The tool face angle will be recorded by a sensor while recording the signals. The signals are associated with the tool face measurements in computing a formation parameter of interest. When the tool rotates, measurements from two transverse (e.g., X and Y) elemental receiving antennas as a function of tool face angle will resemble each other, which provides data redundancy. Combining a larger set of measurements may be used for subsequent processing and interpretation, while independently processing measurements from each transverse elemental antenna may be used for quality control purposes, among others.

Cross-component antenna arrangements (e.g., an axial transmitting antenna and a transverse elemental receiving antenna) disclosed herein may be used for making azimuthal resistivity measurements for detection and resolution of an adjacent bed boundary in a formation. However, detection and resolution of adjacent bed boundaries using such cross-component antenna arrangements may oftentimes be affected by formation resistivity anisotropy (e.g., directionally dependent formation properties). That is, formation resistivity anisotropy may produce an anomalous signal similar to that produced by an adjacent bed boundary. The cross-component response to an anisotropic formation may be written as:

$$V_{zx} = \frac{M_T M_R I}{4\pi L^3} \left[ \frac{\cos\theta}{\sin\theta} ik_h L \left( e^{ik_h L} - e^{ik_h \beta L} \right) \right] \quad (14)$$

Where:

$$k_h = (i\omega\mu\sigma_h)^{1/2} \quad (15)$$

$$\beta = \left( \cos^2\theta + \frac{R_h}{R_v} \sin^2\theta \right)^{1/2}$$

In the above equation, $M_T$ and $M_R$ are the effective areas of the transmitting and receiving antennas, respectively, I is the driving current in the transmitting antenna, and $\theta$ is the relative dip angle of the formation relative to the tool axis. If the resistivity anisotropy is produced by lamination of thin beds of different resistivity values, the relative dip angle $\theta$ will be 90 degrees if the wellbore (or tool axis) is parallel to the bedding planes. $V_{zx}$ will be nonzero as long as the relative dip angle $\theta$ is different from 0 or 90 degrees. As determined from equation (14), the cross-component signal $V_{zx}$ will remain the same if the relative dip angle changes by 180 degrees. Therefore, an axial transmitting antenna located longitudinally on one side of the receiving antenna will produce the same response as if the transmitting antenna is moved to the other side of the receiving antenna at a symmetrical position and driven with the same driving current. Hence, a signal response due to an anisotropic formation may be removed by subtracting the responses generated by two longitudinally symmetrical transmitting antennas. In contrast, the responses produced at an adjacent bed boundary due to two longitudinally symmetrical transmitting antennas will have opposite signs if the axial magnetic moments of the transmitting antennas point in the same longitudinally direction. Hence, subtracting the two responses from each other will enhance the bed boundary response.

A method of data acquisition is disclosed for suppressing certain formation parameters while amplifying others, which includes firing two transmitting antennas at least substantially simultaneously. Currents may be driven simultaneously to two transmitting antennas for generating axial magnetic moments in opposite directions, thereby inducing a voltage signal in the wire winding of the receiving antenna related to a parameter of an adjacent formation bed boundary (and reducing or cancelling the formation resistivity anisotropy effect). Alternatively, currents may be driven simultaneously to two transmitting antennas for generating axial magnetic moments in the same direction, thereby inducing a voltage signal in the wire winding of the receiving antenna related to a parameter of formation resistivity anisotropy (and reducing or cancelling the bed boundary effect).

Simultaneously driving currents to the two transmitting antennas produces a stronger signal and greater signal-to-noise ratio (SNR) than sequentially driving currents to transmitting antennas at the same power input. As an example, for total data acquisition time of T, and $V_0$ indicating the voltage signal detected by a receiving antenna for a unit driving current in a transmitting antenna, the power consumption by the transmitting antenna may be written as:

$$P = I^2 R \quad (16)$$

where R is the total resistance of the antenna, i.e., the sum of the antenna wire resistance and the antenna radiation resistance. Noise in the received signal may be assumed to be random and stacking of data will result in reduction in noise according to:

$$n = cn_0/\sqrt{t} \quad (17)$$

where $n_0$ is the noise level without any stacking, t is the acquisition time, and c is a proportionality constant. For sequential acquisition, the signal level is calculated by:

$$V_1 = V_0 \sqrt{\frac{P}{R}} \quad (18)$$

Combining the two sequential measurements will result in a signal-to-noise (SNR) ratio for the combined signal calculated by:

$$SNR_1 = \frac{V_0 \sqrt{PT/R}}{cn_0} \quad (19)$$

Similarly, for simultaneous acquisition, the total signal level is calculated by:

$$V_1 = V_0 \sqrt{\frac{2P}{R}} \quad (20)$$

The corresponding SNR is calculated by:

$$SNR_2 = \frac{V_0 \sqrt{PT/R}}{cn_0} = \sqrt{2} SNR_1 \quad (21)$$

As shown, the SNR for simultaneous acquisition is increased by a factor of $\sqrt{2}$ over sequential acquisition for the same input power. After binning the measurements made at multiple tool face angles into a number of sectors, the SNR for each sector will be less than that for the entire data combined. However, the relative gain in the SNR for each sector with simultaneous acquisition will remain the same as compared to sequential acquisition. In simultaneous acquisition, the two antennas preferably have the same effective cross-sectional area and are driven with currents of the same magnitude. If they have different effective cross-sectional areas, the driving currents then must be adjusted such that the products of the effective cross-sectional area and the driving current are the same.

Figure 7:
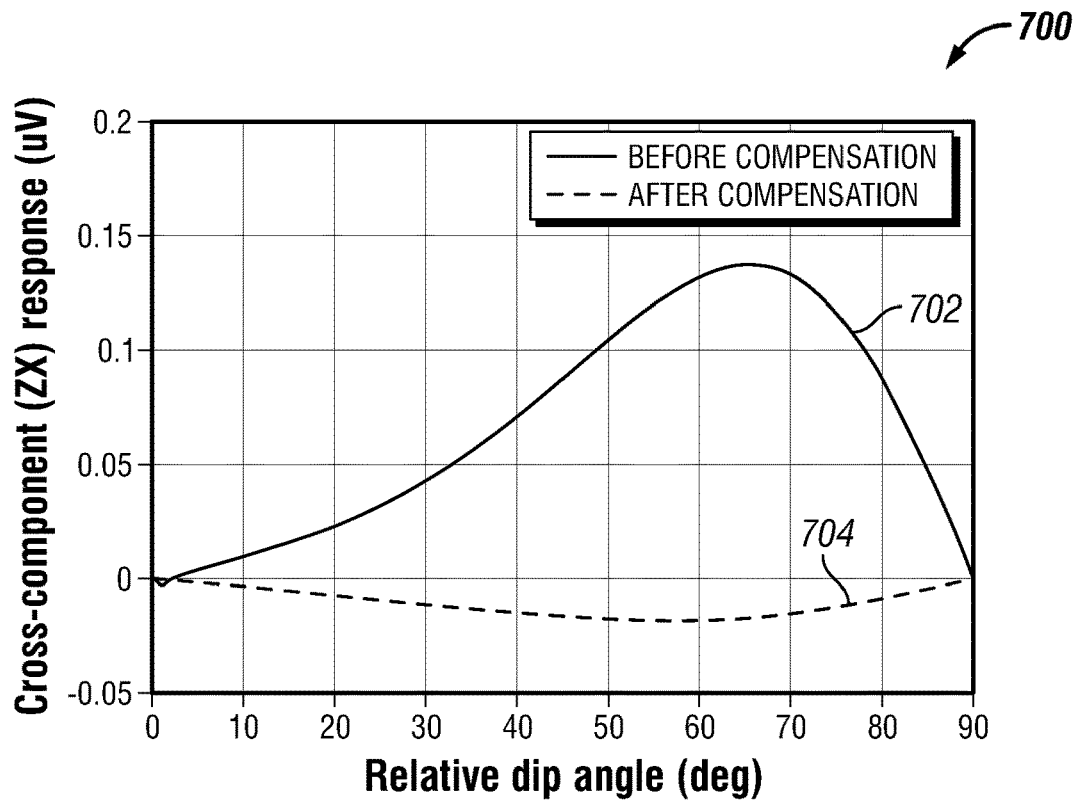
FIG. 7 illustrates a graph showing measured signal responses due to an anisotropic formation with and without measurement compensation.

In the above discussion, the two transmitting antennas are substantially equally spaced apart from the receiving antenna(s). In instances where the two transmitting antennas have different spacings from the receiving antenna(s), additional methods for compensating for formation anisotropy effect are disclosed. In a first method, the two signals may be measured, with either sequential data acquisition or simultaneous data acquisition, and subtracted. Subtracting the signals may work if the coil spacing is small. As an example, coil spacing may be less than ten inches or less than twenty inches. In other examples, coil spacing may be twenty inches or greater. FIG. 7 illustrates a graph 700 showing signal responses due to an anisotropic formation, an uncompensated signal response 702 and compensated signal response 704 using the first method. The parameters are: Rh=1 ohmm, Rv=5 ohmm, θ=100°, $L_1$=40 in., $L_2$=38 in., and f=2 MHz. The compensated signal is defined as:

$$V_{zx}^{Comp} = \frac{1}{2}(V_{zx1} - V_{zx2}) \tag{22}$$

A coefficient of ½ is included so that after the compensation the bed boundary response remains the same (if the bed boundary is parallel to the tool axis). As shown, the first compensation method reduces the anisotropy effect by a factor of approximately 9.1, which represents a great reduction in the anisotropy effect.

In a second method, equation (22) is corrected by adjusting the scaling factor L (see equation (14)) to further compensate for the formation anisotropy effect. The two individual signals may be combined as follows to produce a new compensated signal:

$$V_{zx}^{Comp} = \frac{1}{L_1^3 + L_2^3}(V_{zx1}L_1^3 - V_{zx2}L_2^3) \tag{23}$$

Figure 8:
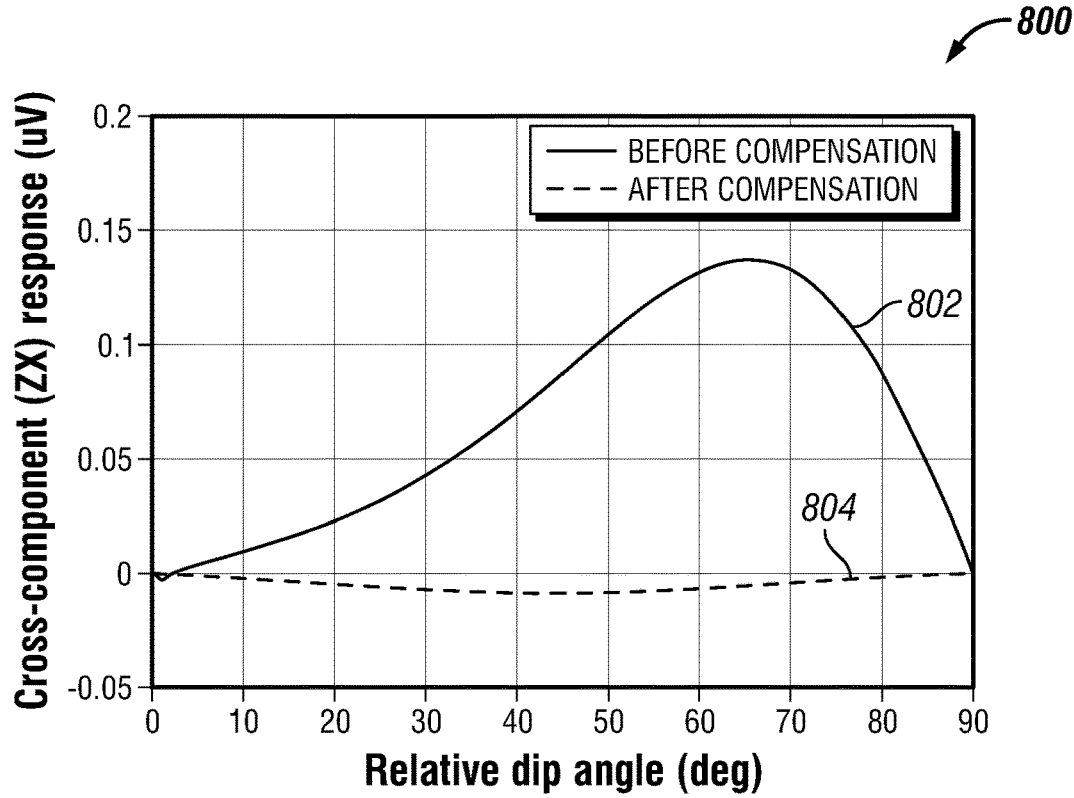
FIG. 8 illustrates a graph showing measured signal responses due to an anisotropic formation with and without measurement compensation.

As shown, equation (23) reduces to equation (22) if $L_1$=$L_2$. FIG. 8 illustrates a graph 800 showing signal responses due to an anisotropic formation, an uncompensated signal response 802 and compensated signal response 804 using the second method according to equation (23). The second compensation method reduces the anisotropy effect by a factor of approximately 16.3, nearly doubling that of the first compensation method. Equation (23) may also be implemented for simultaneous data acquisition. To do so, the currents in the two transmitter antennas are scaled by factors of $L_1^3/(L_1^3+L_2^3)$ and $L_2^3/(L_1^3+L_2^3)$, respectively.

In a third method, the anisotropy effect is directly removed from signal measurements by numerically computing the anisotropy effect using equation (14). In the equation, the two unknown parameters Rh and β may be calculated from the propagation resistivity measurements. The relative dip angle θ must be input from other sources, e.g., the well deviation angle and the known formation dip angle.

An azimuthal resistivity measurement tool acquires data at multiple tool face angles, which may be regularly or irregularly distributed in the tool face domain, depending on the rotation speed of the tool. It is often desirable that the data acquired over a certain period of time is partitioned or "binned" into sectors. A method of data binning is disclosed. To illustrate, it may be assumed that a total of M sectors are formed to cover the entire tool face angle range of 0° to 360°. For the k-th sector $\phi=[\phi_k, \phi_{k+1}]$, it may be assumed that the sector contains N data points, $d_i$, for 1≤i≤N, with corresponding tool face angles $\phi_i$. The uncertainty in the tool face angle measurement for each data point may be defined by a fidelity function g(ϕ). The fidelity function may be different from zero only over a finite tool face angle range. For simplicity, the fidelity function may be assumed to be the same for all data points, although this is not necessary. Three scenarios may occur: (1) the fidelity function associated with a data point is contained entirely within a sector, (2) the fidelity function is partly contained in a sector, and (3) the fidelity function is completely outside a sector. Equation (24) best applies to cases where the data points are associated with evenly distributed tool face angles. Mathematically, this may be expressed as:

$$D_k = \frac{\sum_i w_i d_i}{\sum_i w_i} \tag{24}$$

In the above, $D_k$ is the binned data for the k-th sector and $$w_i = \int_{\phi_{k-1}}^{\phi_k} g(\phi - \phi_i) d\phi \tag{25}$$

The selection of a fidelity function for binning data must consider the sensor response characteristics and other hardware and software factors. If the sensor accuracy follows a Gaussian distribution, then the fidelity function may reasonably be taken as the Gaussian function. Binning methods disclosed herein provide that any data points close to the boundary between two adjacent sectors contribute to the binned values of both adjacent sectors. That is, when a data point resides on the boundary between two adjacent sectors, methods disclosed split the data value into the two adjacent sectors. When a data point falls in one sector but is within a range of uncertainty to the sector border with an adjacent sector, the data point will be assigned to both adjacent sectors with different weights, yielding a smooth transition between the two sectors. For example, the range of uncertainty may be within at least one degree of the tool face angle, or at least within three degrees of the tool face angle, or at least within five degrees of the tool face angle, or greater.

Figure 9:
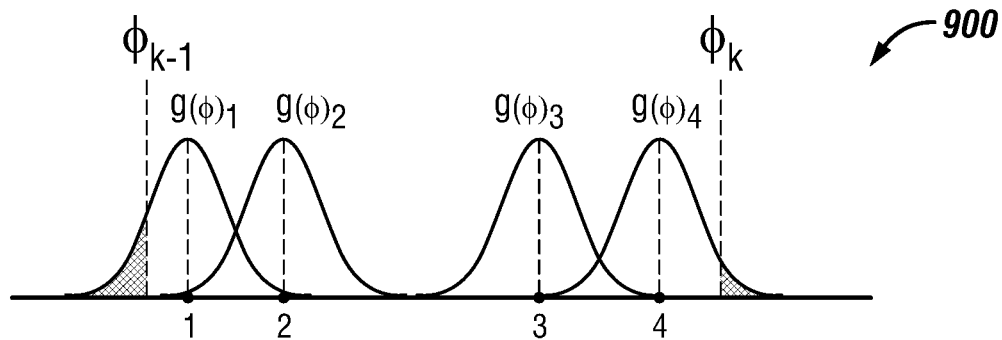
FIG. 9 illustrates a fidelity function related to an embodiment of data binning methods.

FIG. 9 illustrates a plot 900 showing data points with associated fidelity functions. In plot 900, four data points (1, 2, 3, and 4) are illustrated along with their respective fidelity functions g(ϕ). A weighted average value is to be computed and assigned to a sector starting at a tool face angle $\phi_{k-1}$ and ending at the tool face angle $\phi_k$. Data points 1 and 4 are close to the sector lines and their respective fidelity function curves cross the left and right sector lines, respectively. Data points 2 and 3 have their respective fidelity functions fully contained between the two sector lines. As a result, data points 1 and 4 make full contributions to the average data value assigned to the sector, whereas data points 2 and 3 make full contributions. The weight for each data points is calculated from equations (27)-(29).

Figure 10:
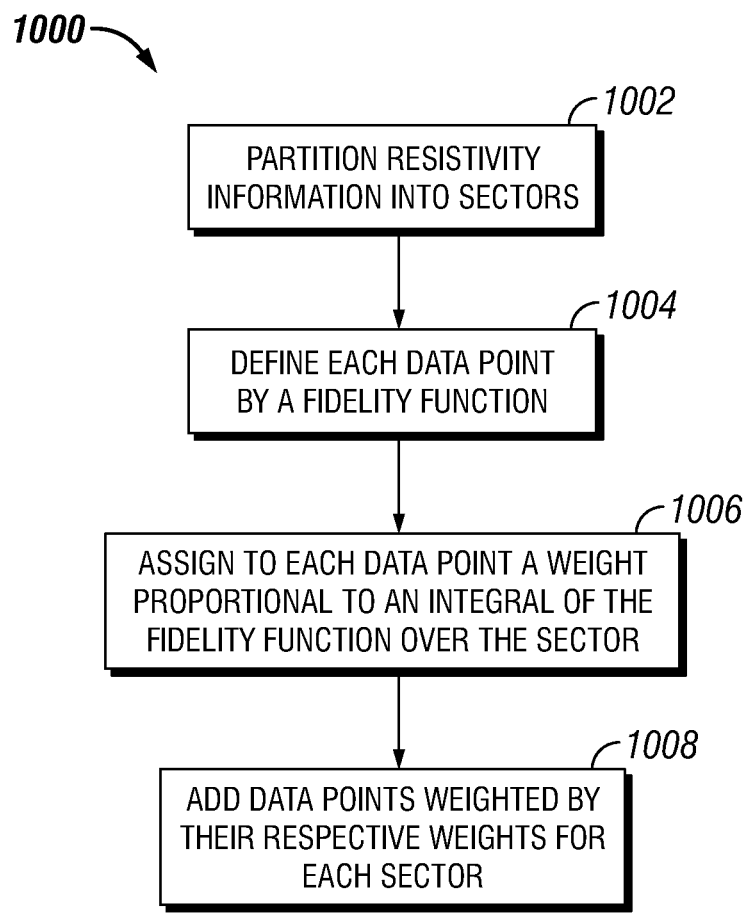
FIG. 10 illustrates a flowchart showing an embodiment of a data binning method.

FIG. 10 illustrates a flow chart showing steps of binning methods disclosed herein. Step (1002) indicates partitioning resistivity information acquired at multiple tool body angles into M number of sectors. Step (1004) indicates defining each data point of the resistivity information by a fidelity function g(Φ). Step (1006) indicates assigning to each data point a weight for each of the M number of sectors, wherein the weight is proportional to an integral of the fidelity function g(Φ) over the sector. Step (1008) indicates adding the data points weighted by their respective weights for each of the M sectors.

Data points will generally be unevenly distributed in tool face angles and should be assigned with tool-face dependent weights in computing a binned value. As an example, the data weight for the i-th data point may be computed as:

$$u_i = \frac{\phi_{i+1} - \phi_{i-1}}{2(\phi_k - \phi_{k-1})} \quad (26)$$

In using equation (26), data points falling in the k-th sector are first scaled according to the equation:

$$d_i^* = \frac{w_i d_i}{w_0} \quad (27)$$

Where:

$$w_0 = \int_{-\infty}^{\infty} g(\phi) d\phi \quad (28)$$

The binned data value is then calculated as:

$$D_k = \frac{\sum_i u_i d_i^*}{\sum_i u_i} \quad (29)$$

Multi-Sensor Subs

Systems with an array of different downhole sensors in a single tool body and methods of using same are described here. While the systems may be interchangeably described as a "sensor sub" or an "at-bit sensor sub" it should be understood that while locating the sensor sub at or near the bit may be useful in some applications the sensor sub may be located further away on the drill string. That is, in some embodiments a multi-sensor sub may be dropped right behind a drill bit or tool that is located above motor, rotary steerable system, or both. In other embodiments the multi-sensor sub may be located further uphole from the drill bit or the tool.

Figure 11:
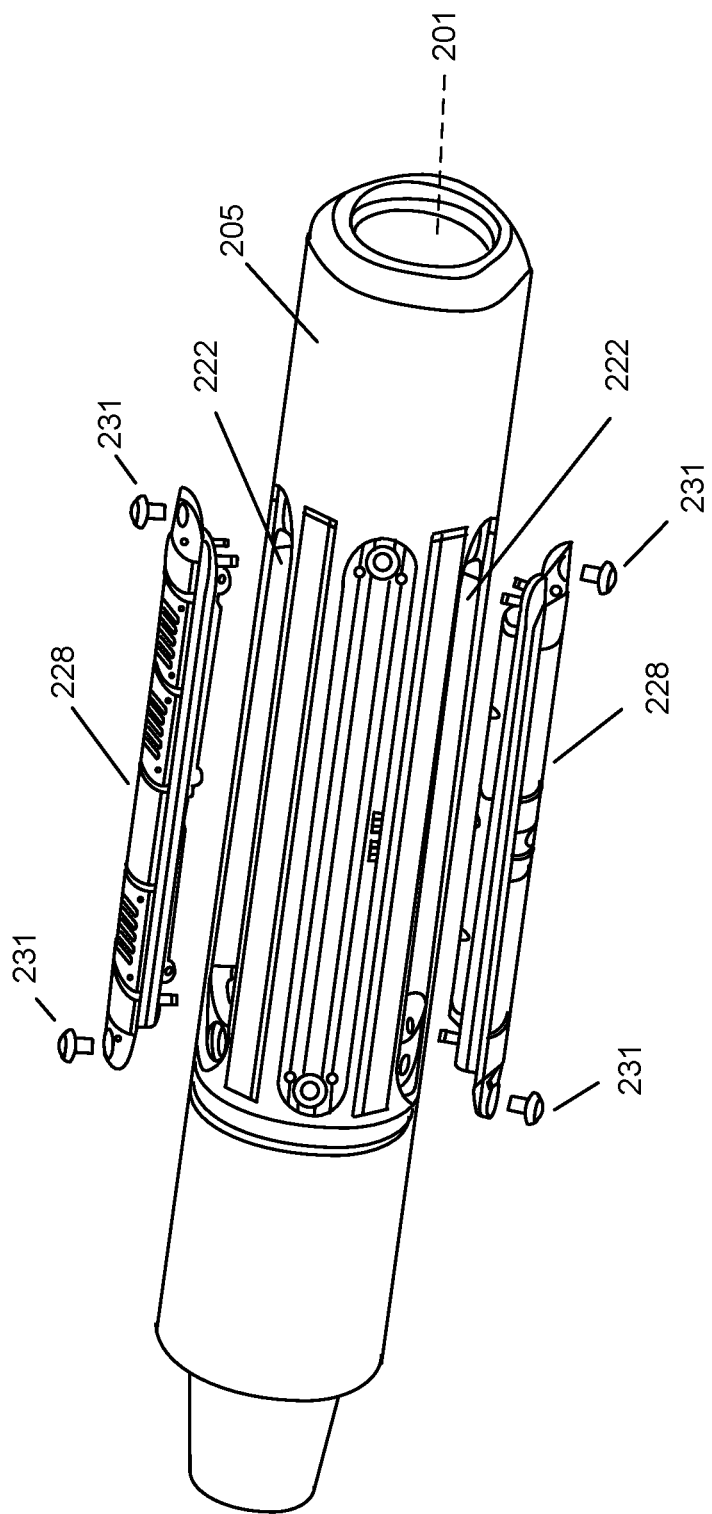
FIG. 11 illustrates a sensor sub with interchangeable types of sensors in one sensor sub according to one embodiment of the present application.

An exemplary sub is shown in FIG. 11. The tool body 205 with longitudinal axis 201 comprises at least one predefined space (pocket) 222 up to two, three, or even more pockets 222. Pocket 222 is generally configured to receive one of many types of measuring sensors (not shown in FIG. 11). Example sensors include, but are not limited to, a type consisting of a resistivity sensor, a sonic sensor, an ultrasonic sensor; a pressure sensor; an electrical imaging sensor; a gamma sensor; a density sensor; a neutron sensor; an acoustic sensor, an accelerometer, a magnetometer, and a gyroscope. The example tool body in FIG. 11 contains two sensor spaces or pockets 222. Each pocket can receive one, two, or even three of more of the aforementioned sensor types.

The sensors may be powered by a local power source (e.g., batteries) or by an external power source (e.g., turbine generator) or even a combination thereof. The tool may have an operably connected central control unit 232 to automatically recognize any number or type of sensor installed in one pocket 222 up to each and every sensor space or pocket 222. The control unit 232 may facilitate control, function, and/or communication with one or more up to all of the sensors. The control unit 232 may also communicate to another downhole tool and/or surface equipment such as a processor through a data telemetry unit 233.

Figure 12:
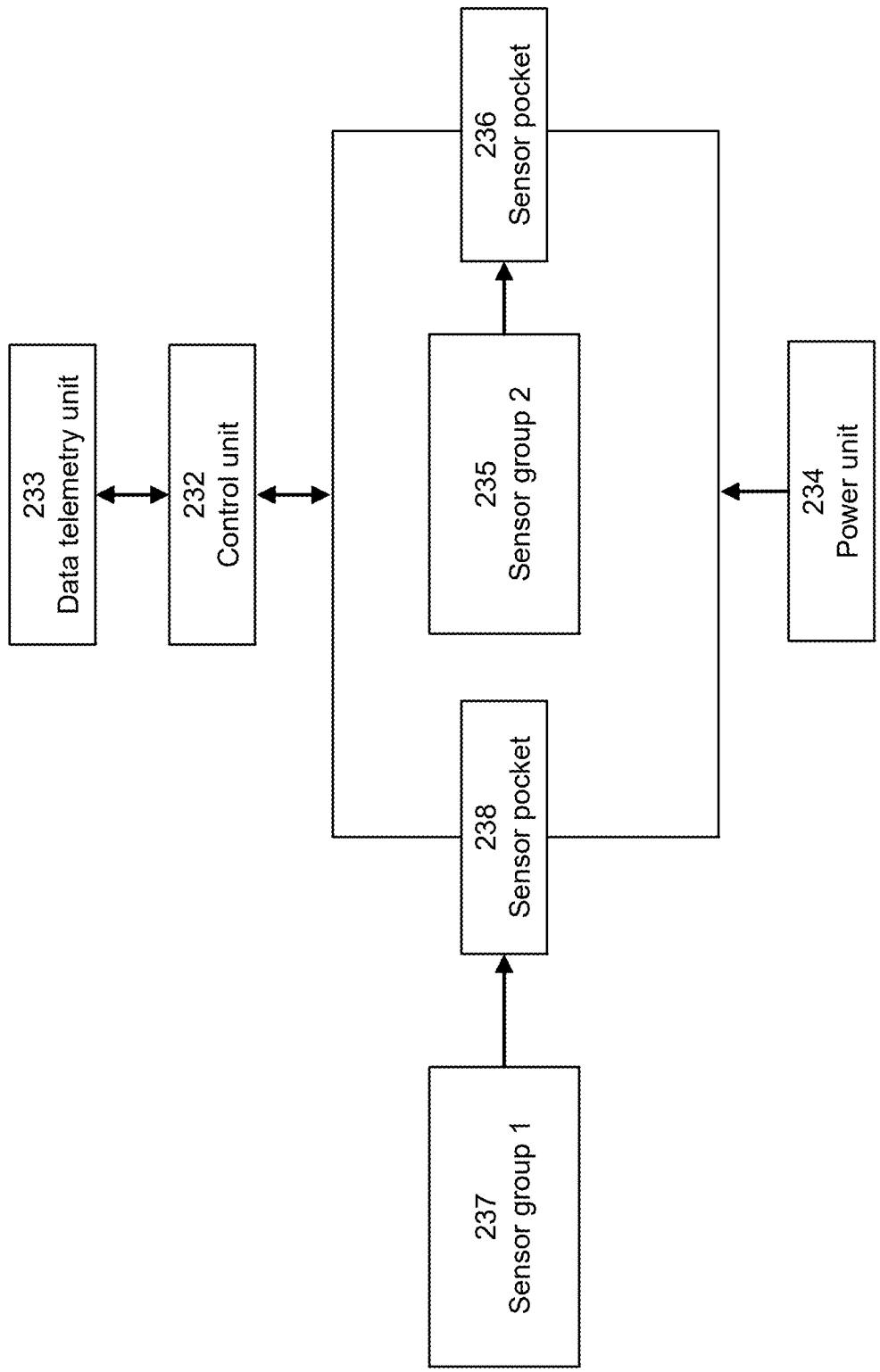
FIG. 12 illustrates an exemplary control system for a sensor sub according to one embodiment of the present application.

FIG. 12 shows a schematic of the tool control system (control unit) for a two-sensor, two pocket tool although it should be understood that additional sensors could be included in either pocket or additional pockets. Such additional sensors may be controlled (or not controlled) by the tool control system. Each sensor pocket 236 and 238 may receive one or more of a group of one type of sensors or more or more of different types of sensors mentioned above. That is, sensor group 1 at 237 is located within pocket 238 while different sensor group 2 at 235 is located within pocket 236. As a further example, in FIG. 12 sensor pocket #1 at 237 may receive one or more resistivity sensors while sensor pocket #2 at 235 may receive one of more of a sonic or ultrasonic sensor. Advantageously, different types of sensors may be interchangeably received in any of the sensor pockets under control of control unit 232.

The communication between the control unit 232 and the sensor groups 235 and 237 may be established through, for example, bus wires. Because different sensors or groups of sensors may use different buses, multiple sets of communication wires may be pre-installed. For example, four communications wires may be needed if both CAN (Controller Area Network) and RS485 buses are desired. Using CAN may add a the data link layer. Both CAN RS485 are typically based on multiple nodes connected to a shared serial bus with one or more potentially acting as a master being possible. In a similar manner, multiple power lines may also be pre-wired to power the different sensors.

Figure 13:
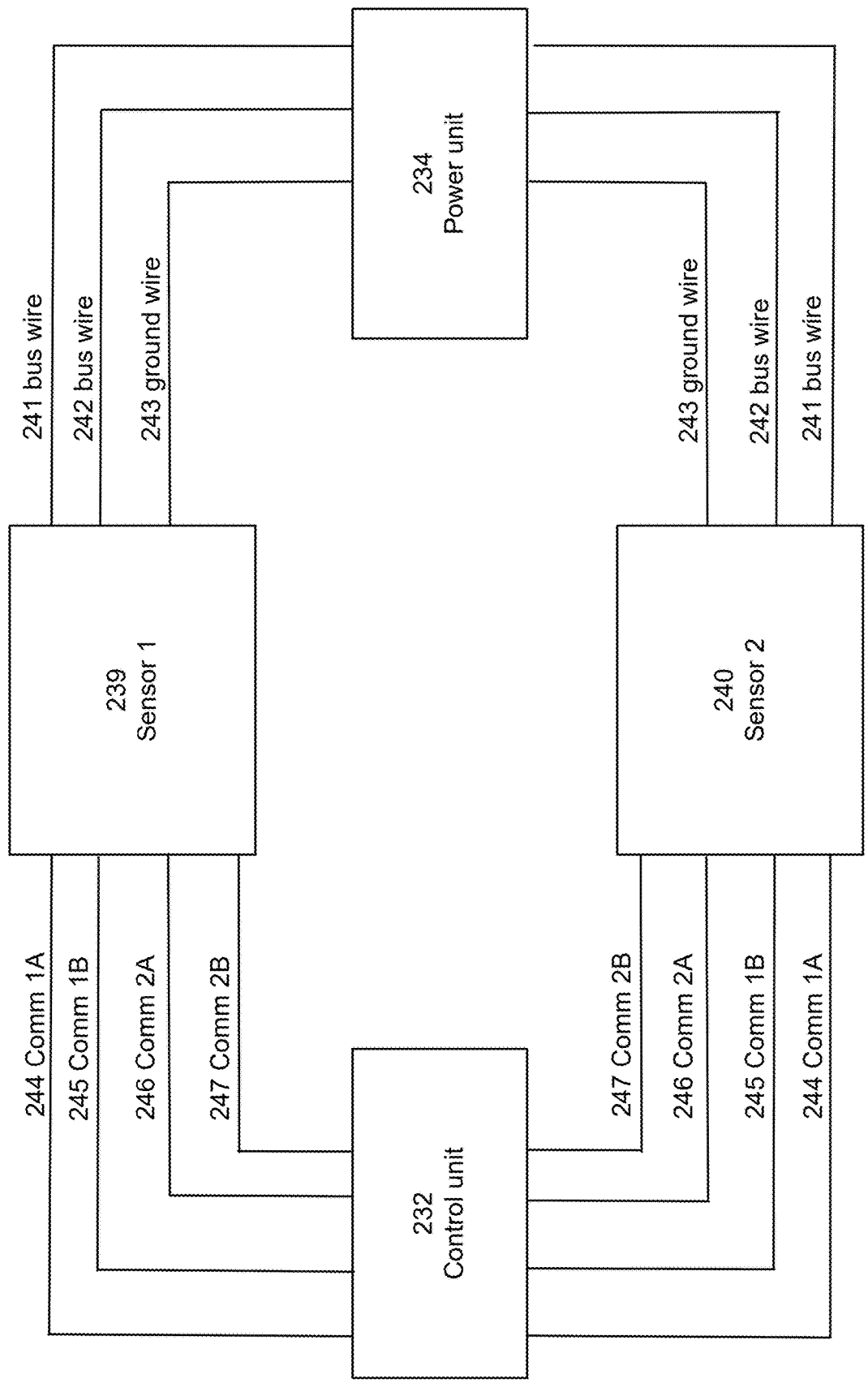
FIG. 13 illustrates communication between a control unit and sensors which may be interchangeable according to one embodiment of the present application.

As shown in FIG. 13 power unit 234 is connected to sensor 1 (239) and sensor 2 (240) through power 1 bus wire 241, power 2 bus wire 242, and ground wire 243. FIG. 13 shows an example of two potential power supplies for, e.g., 18V and 5V. In FIG. 13 sensor 1 (239) and sensor 2 (240) are connected to the control unit 232 through COMM 1A (244), COMM 1B (245), COMM 2A (246), and COMM 2B (247).

In one embodiment, the control unit 232 may first send one or more commands to determine the number and types of sensors that have been installed in a sensor pocket. Once the sensor types are identified, the control unit 232 may communicate with each sensor 239 and 240 in FIG. 13 in one or more pre-defined manners to send and/or receive data to and/or from the sensors. The control unit 232 also may communicate with a data telemetry unit (not shown in FIG. 13) to transmit and/or receive any data to/from the surface.

Figure 14:
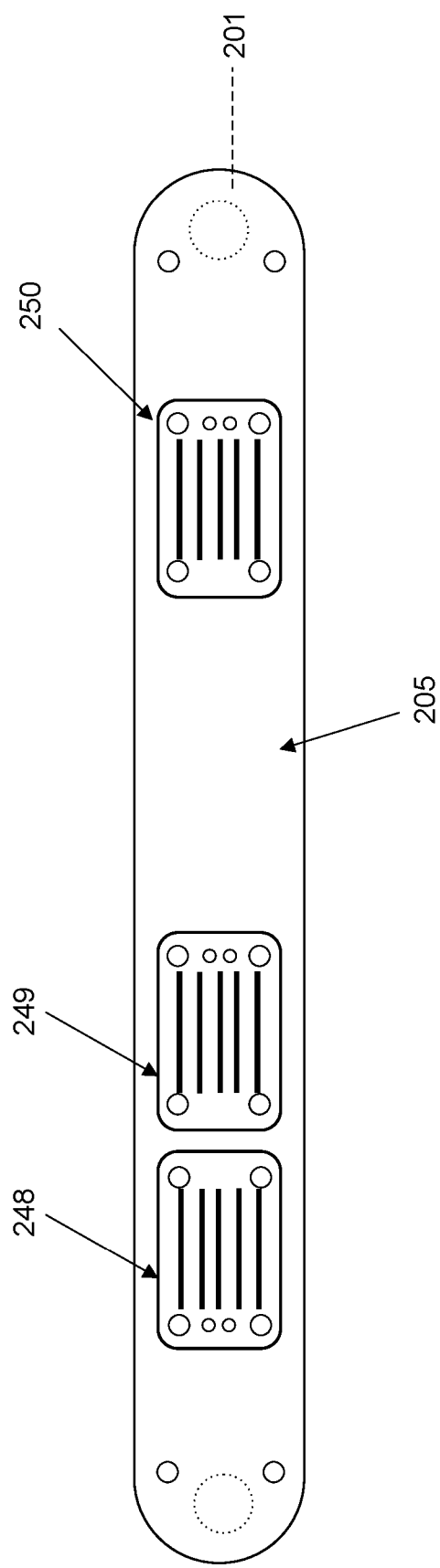
FIG. 14 illustrates a sensor sub according to one embodiment of the present application with three different types of antenna sensors according to one embodiment of the present application.
Figure 15:
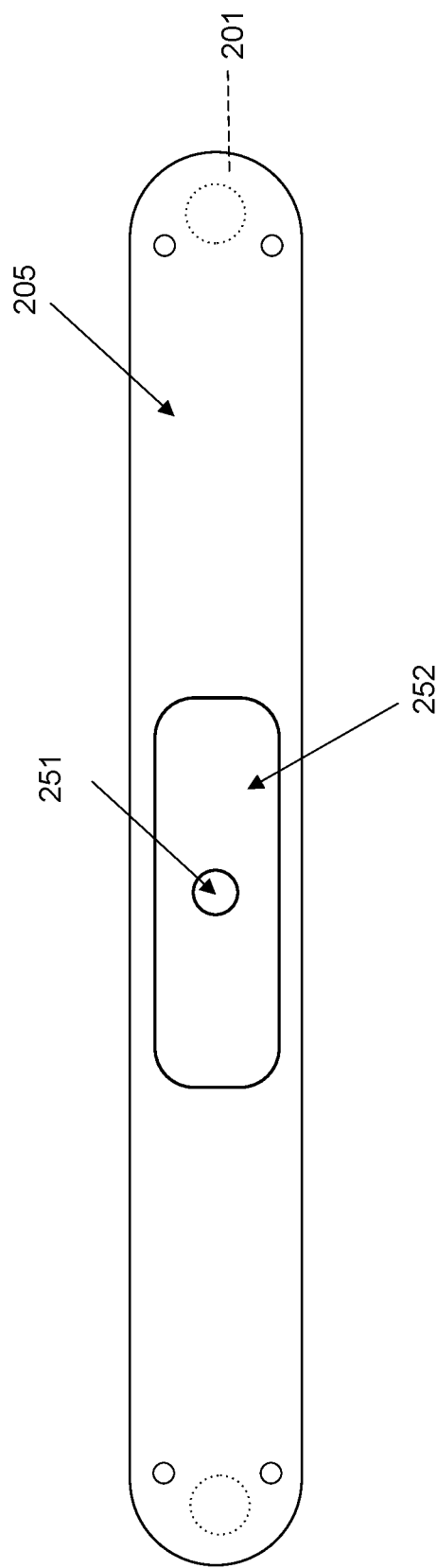
FIG. 15 illustrates a sensor sub according to one embodiment of the present application with different interchangeable sensors such as a measuring electrode and a focusing electrode according to one embodiment of the present application.
Figure 16:
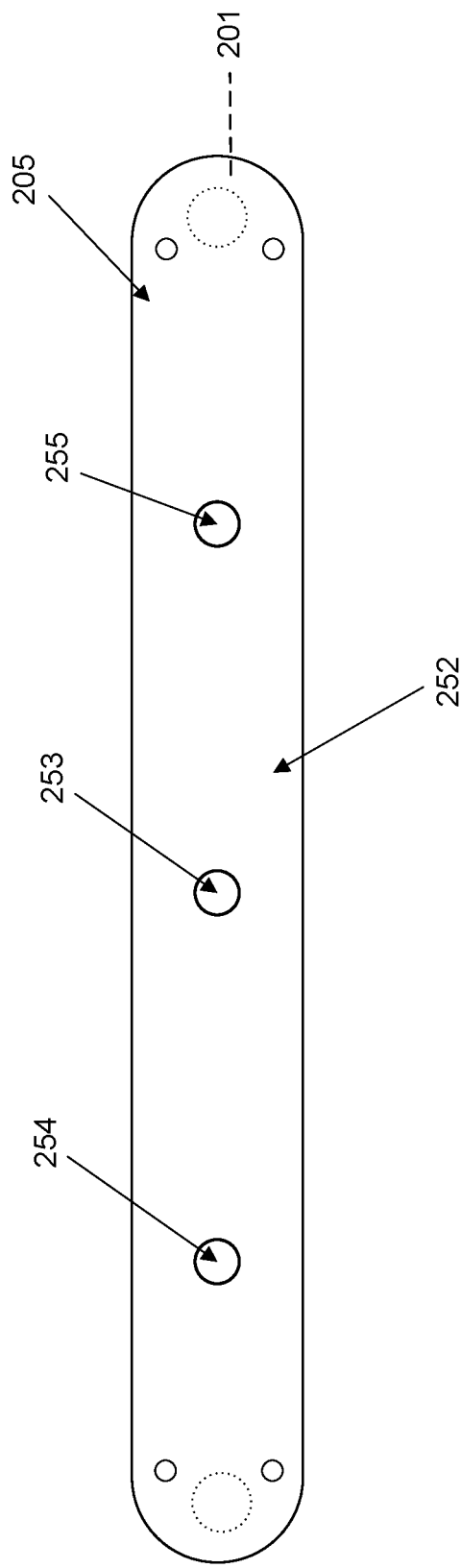
FIG. 16 illustrates a sensor sub according to one embodiment of the present application with different interchangeable sensors such as a short spacing detector, a long spacing detector, and a focusing electrode according to one embodiment of the present application.

FIGS. 14-16 show representative sensor subs with a modular sensor body 205 and longitudinal axis 201 in each. The modular sensor sub in FIG. 14 has a first antenna 248, a second antenna 249, and a third antenna 250. Each antenna may be connected to a power unit and control unit as contemplated in, for example FIGS. 12 and 13.

FIG. 15 shows an exterior measure electrode 251 and a focusing electrode 252 within the interior of a pocket. Each electrode may be connected to a power unit and control unit as contemplated in, for example FIGS. 12 and 13. FIG. 16 shows a source 254, a short-spacing electrode 253, a long-spacing electrode 255 and a focusing electrode 252 and each may be connected to a power unit and control unit as contemplated in, for example FIGS. 12 and 13. Of course, there may be additional sensor types in any one or more of FIGS. 14-16.

Additional Embodiments

1. A sensor sub for use in a drillstring having a drill bit on a distal end for drilling a wellbore in a formation, the sensor sub comprising:
a tool body having a longitudinal axis;
a first pocket on the tool body wherein said first pocket extends radially inward from an outer surface of the tool body;
a second pocket on the tool body wherein said second pocket extends radially inward from an outer surface of the tool body;
wherein the first pocket comprises a first sensor selected from a type consisting of resistivity sensor, a sonic sensor, an ultrasonic sensor; a pressure sensor; an electrical imaging sensor; a gamma sensor; a density sensor; a neutron sensor; an acoustic sensor, an accelerometer, a magnetometer, and a gyroscope;
wherein the second pocket comprises a second sensor selected from a type consisting of resistivity sensor, a sonic sensor, an ultrasonic sensor; a pressure sensor; an electrical imaging sensor; a gamma sensor; a density sensor; a neutron sensor; an acoustic sensor, an accelerometer, a magnetometer, and a gyroscope;
wherein the first sensor and the second sensor are each a different type; and
a control unit operably connected to the first sensor and the second sensor wherein the control unit is configured to determine the type of sensor, send data to the first and second sensor, and receive data from the first and second sensor.

2. The sensor sub of embodiment 1 further comprising:
a third pocket on the tool body wherein said third pocket extends radially inward from an outer surface of the tool body;
wherein the third pocket comprises a third sensor selected from a type consisting of resistivity sensor, a sonic sensor, an ultrasonic sensor; a pressure sensor; an electrical imaging sensor; a gamma sensor; a density sensor; a neutron sensor; an acoustic sensor, an accelerometer, a magnetometer, and a gyroscope; and
wherein the third sensor is a different type than the first sensor and the second sensor.

3. The sensor sub of embodiment 1 further comprising a data telemetry unit configured to communicate with the control unit wherein the data telemetry unity is configured to transmit data to (1) a surface processor, (2) other downhole equipment, or (3) both (1) and (2).

4. The sensor sub of embodiment 1 further comprising a power source.

5. The sensor sub of embodiment 4 wherein the power source is a battery.

6. The sensor sub of embodiment 4 wherein the power source is a turbine generator.

7. The sensor sub of embodiment 1 wherein the first pocket comprises an additional sensor.

8. The sensor sub of embodiment 7 wherein the additional sensor is operably connected to the control unit.

9. The sensor sub of embodiment 1 wherein the first pocket and the second pocket each comprise an additional sensor.

10. The sensor sub of embodiment 9 wherein each additional sensor is operably connected to the control unit.

11. The sensor sub of embodiment 2 wherein the first pocket and the second pocket and the third pocket each comprise an additional sensor.

12. The sensor sub of embodiment 11 wherein each additional sensor is operably connected to the control unit.

13. The sensor sub of embodiment 1 wherein the first sensor is a resistivity sensor and the second sensor is a density sensor or a neutron sensor.

14. The sensor sub of embodiment 2 wherein the first sensor is a resistivity sensor, the second sensor is a density sensor, and the third sensor is a neutron sensor.

15. The sensor sub of embodiment 1 wherein the first sensor is a resistivity sensor and the second sensor is a sonic sensor or an ultrasonic sensor.

16. The sensor sub of embodiment 1 wherein the control unit operably connected to the first sensor and the second sensor is configured such that the first sensor type, the second sensor type, or both the first sensor type and second sensor type is interchangeable with another sensor type.

17. The sensor sub of embodiment 2 wherein the control unit is operably connected to the third sensor.

18. The sensor sub of embodiment 17 wherein the control unit operably connected to the first sensor, the second sensor, and the third sensor is configured such that at least both the first sensor type and the second sensor type are interchangeable with another sensor type.

19. The sensor sub of embodiment 1 wherein the first sensor comprises an axial antenna and the second sensor comprises a transverse antenna.

20. The sensor sub of embodiment 1, further comprising a non-conducting material disposed within the first pocket, the second pocket, or both.

21. The sensor sub of embodiment 1, further comprising a first covering attached to the tool body to cover the first pocket and a second covering attached to the tool body to cover the second pocket.

22. The sensor sub of embodiment 21, wherein the first covering, the second covering, or both comprise one or more opening to allow electromagnetic energy to pass through.

23. The sensor sub of embodiment 22, wherein the openings are aligned in an azimuthal direction.

24. A sensor sub for use in a drillstring having a drill bit on a distal end for drilling a wellbore in a formation, the sensor sub comprising:
a tool body having a longitudinal axis;
a pocket on the tool body wherein said pocket extends radially inward from an outer surface of the tool body;
wherein the pocket comprises a sensor selected from a type consisting of resistivity sensor, a sonic sensor, an ultrasonic sensor; a pressure sensor; an electrical imaging sensor; a gamma sensor; a density sensor; a neutron sensor; an acoustic sensor, an accelerometer, a magnetometer, and a gyroscope; and
a control unit operably connected to the sensor wherein the control unit is configured to determine the type of sensor, send data to the sensor, and receive data from the sensor.

25. A method of making two or more different types of measurements of a formation from a wellbore being drilled, the method comprising:
providing a sensor sub comprising: a tool body having a longitudinal axis; a first pocket on the tool body wherein said first pocket extends radially inward from an outer surface of the tool body; a second pocket on the tool body wherein said second pocket extends radially inward from an outer surface of the tool body; wherein the first pocket comprises a first sensor selected from a type consisting of resistivity sensor, a sonic sensor, an ultrasonic sensor; a pressure sensor; an electrical imaging sensor; a gamma sensor; a density sensor; a neutron sensor; an acoustic sensor, an accelerometer, a magnetometer, and a gyroscope; wherein the second pocket comprises a second sensor selected from a type consisting of resistivity sensor, a sonic sensor, an ultrasonic sensor; a pressure sensor; an electrical imaging sensor; a gamma sensor; a density sensor; a neutron sensor; an acoustic sensor; an accelerometer, a magnetometer, and a gyroscope; wherein the first sensor and the second sensor are each a different type; and a control unit operably connected to the first sensor and the second sensor wherein the control unit is configured to determine the type of sensor, send data to the first and second sensor, and receive data from the first and second sensor; and; measuring the two or more different types of measurements of the formation.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. A sensor sub for use in a drillstring having a drill bit on a distal end for drilling a wellbore in a formation, the sensor sub comprising:
  a tool body having a longitudinal axis wherein the tool body is substantially cylindrical;
  a first pocket within the tool body wherein said first pocket extends radially inward from an outer surface of the substantially cylindrical tool body;
  a second pocket within the tool body wherein said second pocket extends radially inward from an outer surface of the substantially cylindrical tool body;
  wherein the first pocket comprises a first sensor selected from a type consisting of resistivity sensor, a sonic sensor, an ultrasonic sensor; a pressure sensor; an electrical imaging sensor; a gamma sensor; a density sensor; a neutron sensor; an acoustic sensor, an accelerometer, a magnetometer, and a gyroscope;
  wherein the second pocket comprises a second sensor selected from a type consisting of resistivity sensor, a sonic sensor, an ultrasonic sensor; a pressure sensor; an electrical imaging sensor; a gamma sensor; a density sensor; a neutron sensor; an acoustic sensor; an accelerometer, a magnetometer, and a gyroscope;
  wherein the first sensor and the second sensor are each a different type;
  a control unit operably connected to the first sensor and the second sensor wherein the control unit is configured to determine the type of sensor and receive formation parameter data from the first and second sensor;
  a first power source with a voltage and a second power source with a different voltage than the first power source;
  two or more communication wires from the control unit to the first sensor in the first pocket; and
  two or more communication wires from the control unit to the second sensor in the second pocket.

2. The sensor sub of claim 1 further comprising:
  a third pocket on the tool body wherein said third pocket extends radially inward from an outer surface of the tool body;
  wherein the third pocket comprises a third sensor selected from a type consisting of resistivity sensor, a sonic sensor, an ultrasonic sensor; a pressure sensor; an electrical imaging sensor; a gamma sensor; a density sensor; a neutron sensor; an acoustic sensor; an accelerometer, a magnetometer, and a gyroscope; and
  wherein the third sensor is a different type than the first sensor and the second sensor.

3. The sensor sub of claim 1 further comprising a data telemetry unit configured to communicate with the control unit wherein the data telemetry unity is configured to transmit formation parameter data to (1) a surface processor, (2) other downhole equipment, or (3) both (1) and (2).

4. The sensor sub of claim 1 wherein the power source is a battery.

5. The sensor sub of claim 1 wherein the power source is a turbine generator.

6. The sensor sub of claim 1 wherein the first pocket comprises an additional sensor.

7. The sensor sub of claim 6 wherein the additional sensor is operably connected to the control unit.

8. The sensor sub of claim 1 wherein the first pocket and the second pocket each comprise an additional sensor.

9. The sensor sub of claim 8 wherein each additional sensor is operably connected to the control unit.

10. The sensor sub of claim 2 wherein the first pocket and the second pocket and the third pocket each comprise an additional sensor.

11. The sensor sub of claim 10 wherein each additional sensor is operably connected to the control unit.

12. The sensor sub of claim 1 wherein the first sensor is a resistivity sensor and the second sensor is a density sensor or a neutron sensor.

13. The sensor sub of claim 2 wherein the first sensor is a resistivity sensor, the second sensor is a density sensor, and the third sensor is a neutron sensor.

14. The sensor sub of claim 1 wherein the first sensor is a resistivity sensor and the second sensor is a sonic sensor or an ultrasonic sensor.

15. The sensor sub of claim 1 wherein the control unit operably connected to the first sensor and the second sensor is configured such that the first sensor type, the second sensor type, or both the first sensor type and second sensor type is interchangeable with another sensor type.

16. The sensor sub of claim 2 wherein the control unit is operably connected to the third sensor.

17. The sensor sub of claim 16 wherein the control unit operably connected to the first sensor, the second sensor, and the third sensor is configured such that at least both the first sensor type and the second sensor type are interchangeable with another sensor type.

18. The sensor sub of claim 1 wherein the first sensor comprises an axial antenna and the second sensor comprises a transverse antenna.

19. The sensor sub of claim 1, further comprising a non-conducting material disposed within the first pocket, the second pocket, or both.

20. The sensor sub of claim 1, further comprising a first covering attached to the tool body to cover the first pocket and a second covering attached to the tool body to cover the second pocket.

21. The sensor sub of claim 20, wherein the first covering, the second covering, or both comprise one or more openings to allow electromagnetic energy to pass through.

22. The sensor sub of claim 21, wherein the openings are aligned in an azimuthal direction.

23. A method of making two or more different types of measurements of a formation from a wellbore being drilled, the method comprising:
- providing a sensor sub comprising:
  - a tool body having a longitudinal axis wherein the tool body is substantially cylindrical;
  - a first pocket within the tool body wherein said first pocket extends radially inward from an outer surface of the substantially cylindrical tool body;
  - a second pocket within the tool body wherein said second pocket extends radially inward from an outer surface of the substantially cylindrical tool body;
  - wherein the first pocket comprises a first sensor selected from a type consisting of resistivity sensor, a sonic sensor, an ultrasonic sensor; a pressure sensor; an electrical imaging sensor; a gamma sensor; a density sensor; a neutron sensor; an acoustic sensor, an accelerometer, a magnetometer, and a gyroscope;
  - wherein the second pocket comprises a second sensor selected from a type consisting of resistivity sensor, a sonic sensor, an ultrasonic sensor; a pressure sensor; an electrical imaging sensor; a gamma sensor; a density sensor; a neutron sensor; an acoustic sensor; an accelerometer, a magnetometer, and a gyroscope;
  - wherein the first sensor and the second sensor are each a different type;
  - a control unit operably connected to the first sensor and the second sensor wherein the control unit is configured to determine the type of sensor and receive formation parameter data from the first and second sensor;
  - a first power source with a voltage and a second power source with a different voltage than the first power source;
  - two or more communication wires from the control unit to the first sensor in the first pocket; and
  - two or more communication wires from the control unit to the second sensor in the second pocket
and;
- measuring the two or more different types of measurements of the formation.

* * * * *